United States Patent
LeVine et al.

(10) Patent No.: US 8,015,608 B2
(45) Date of Patent: Sep. 6, 2011

(54) SYSTEMS AND METHODS FOR PREVENTING UNAUTHORIZED USE OF DIGITAL CONTENT

(75) Inventors: Richard B. LeVine, Marstons Mills, MA (US); Andrew R. Lee, Marlborough, MA (US); Daniel G. Howard, Mashpee, MA (US); John J. Hart, III, Mashpee, MA (US)

(73) Assignee: SCA IPLA Holdings Inc., New York, NY (US)

( * ) Notice: Subject to any disclaimer, the term of this patent is extended or adjusted under 35 U.S.C. 154(b) by 0 days.

(21) Appl. No.: 12/460,506

(22) Filed: Jul. 20, 2009

(65) Prior Publication Data

US 2010/0122349 A1 May 13, 2010

Related U.S. Application Data

(62) Division of application No. 09/960,610, filed on Sep. 21, 2001, now Pat. No. 7,565,697.

(60) Provisional application No. 60/234,657, filed on Sep. 22, 2000, provisional application No. 60/240,611, filed on Oct. 16, 2000, provisional application No. 60/242,949, filed on Oct. 24, 2000, provisional application No. 60/244,704, filed on Oct. 31, 2000.

(51) Int. Cl.
*G06F 21/22* (2006.01)
*G06F 11/30* (2006.01)

(52) U.S. Cl. .............. 726/22; 726/2; 726/27; 705/51

(58) Field of Classification Search ................ None
See application file for complete search history.

(56) References Cited

U.S. PATENT DOCUMENTS

| | | | | |
|---|---|---|---|---|
| 5,548,645 A * | 8/1996 | Ananda | .......................... | 705/52 |
| 5,638,513 A * | 6/1997 | Ananda | .......................... | 726/5 |
| 5,974,549 A * | 10/1999 | Golan | ............................ | 726/23 |
| 6,671,813 B2 * | 12/2003 | Ananda | ............................ | 726/3 |
| 6,918,038 B1 * | 7/2005 | Smith et al. | .................... | 726/22 |
| 7,237,123 B2 * | 6/2007 | LeVine et al. | ................ | 713/193 |
| 7,328,453 B2 * | 2/2008 | Merkle et al. | .................. | 726/23 |
| 7,552,337 B2 * | 6/2009 | Chu et al. | ........................ | 713/176 |
| 7,559,091 B2 * | 7/2009 | Chu et al. | ........................ | 726/27 |
| 7,565,697 B2 * | 7/2009 | LeVine et al. | ................ | 726/26 |
| 7,577,997 B2 * | 8/2009 | Chu et al. | ........................ | 726/26 |

(Continued)

OTHER PUBLICATIONS

U.S. Appl. No. 12/791,644, filed Jun. 1, 2010, LeVine, et al.

*Primary Examiner* — Christopher A Revak
(74) *Attorney, Agent, or Firm* — Oblon, Spivak, McClelland, Maier & Neustadt, L.L.P.

(57) ABSTRACT

Theft, distribution, and piracy of digital content (software, video, audio, e-books, any content of any kind that is digitally stored and distributed) is generally accomplished by copying it, if possible, or, if it is protected from being copied in any fashion, such piracy is based upon a number of reverse engineering techniques. Aside from the straightforward copying of unprotected content, all of these other methods require first an understanding of the protective mechanism(s) guarding the content, and finally an unauthorized modification of that protection in order to disable or subvert it. Methods which prevent a skilled individual from using reverse engineering tools and techniques to attain that level of understanding and/or prevent anyone from performing such modifications can offer significant advantages to content creators who wish to protect their products.

18 Claims, 26 Drawing Sheets

U.S. PATENT DOCUMENTS

| | | | |
|---|---|---|---|
| 7,584,509 B2 * | 9/2009 | Wu et al. | 726/27 |
| 7,631,360 B2 * | 12/2009 | Wu et al. | 726/26 |
| 7,640,592 B2 * | 12/2009 | Wu et al. | 726/26 |
| 7,797,702 B1 * | 9/2010 | Ferrie | 718/101 |
| 2008/0115219 A1 * | 5/2008 | Kim et al. | 726/25 |
| 2010/0169973 A1 * | 7/2010 | Kim et al. | 726/23 |

* cited by examiner

SYSTEMS AND METHODS FOR PREVENTING UNAUTHORIZED USE OF DIGITAL CONTENT

RELATED APPLICATIONS

This application is a divisional application of U.S. application Ser. No. 09/960,610, filed Sep. 21, 2001 (now U.S. Pat. No. 7,565,697), which claims the benefit of U.S. Provisional Application Ser. No. 60/234,657, filed Sep. 22, 2000, U.S. Provisional Application Ser. No. 60/240,611, filed Oct. 16, 2000, U.S. Provisional Application Ser. No. 60/242,949, filed Oct. 24, 2000, and U.S. Provisional Application Ser. No. 60/244,704, filed Oct. 31, 2000, the contents of each being incorporated herein by reference, in its entirety.

BACKGROUND OF THE INVENTION

1. Field of the Invention

This invention is related to the field of protecting digital information from being copied, modified, or used by unauthorized parties. In particular this invention is related to systems and methods that prevent unauthorized access to, and modification of, digital data as found on computer systems and consumer-appliance systems that utilize Compact Disc (CD), DVD, or other removable media (such as Flash Memory on standard or proprietary cards or sticks, or other non-volatile memory) technologies.

2. Description of the Related Art

The electronic publishing industry for application software, computer games, appliance-console games, movies, and music, is facing a growing and serious problem; namely, the piracy and unauthorized modification and use of their content. Since digital content is by nature capable of being copied exactly, wherein a copy is identical in every way to the original, and since the tools to do so are increasingly available, the industry is facing increasing losses. Such losses may include the unauthorized copying of a CD containing a game, or the unauthorized reverse engineering and modification of a word processing program to allow for its illegal distribution, or the reverse engineering of a copy protection scheme to disable it, making it possible to make duplicates with ease.

There are many mechanisms available that may be used to limit or prevent unauthorized access to digital content. Following deployment, such mechanisms are often times subsequently compromised by hackers, and the methods and techniques used to compromise them have been widely disseminated and actively used and enhanced. Most protections are simplistic in nature, and depend to large degree on the secrecy of the simple method as much as its inherent security or ingenuity, such that if not defeated prior to publication, the act of publishing them, for example in patent form, reveals enough about them to render them less effective. More than one of these approaches may be defeated if anticipated by using "ProcDump", a memory lifting tool that is available free on the World Wide Web (such a tool may also be easily written following technical instructions that may also be found on the web) in conjunction with SoftICE, a powerful debugging tool, which may also be found on the web. A computer system is usually the platform and tool of choice for one intent on reverse engineering or cracking these protection mechanisms; even if the protected content's target was not a computer system such as a PC but rather an appliance computing device such as a game console, the content can best be modified ("hacked") on a computer. In terms of protecting content from copying or modification by a skilled person with a modern computer system, most inventions in the field (see below) are not protected from being reverse engineered, modified, or content-duplicated by means of commonly available tools such as "SoftICE" (an in-circuit emulator and very powerful debugger), "ProcDump" (can capture any data content from any memory location, regardless of how protected the memory was thought to be), "IDA" (a disassembler), and "FileMon" (a file system monitoring and transcribing service tool). There are no design secrets that can be kept from such a set of tools, and there are many more such tools in existence, and more being created all the time. Therefore it becomes far more important to have well designed mechanisms that do not depend on their secrecy, as much as their design, to ensure security.

A number of patent references describe a variety of methods for protection of digital data and content. These include the following U.S. Pat. Nos. 4,405,829, 4,864,616, 4,888,800, 4,999,806, 5,021,997, 5,027,396, 5,033,084, 5,081,675, 5,155,847, 5,166,886, 5,191,611, 5,220,606, 5,222,133, 5,313,521, 5,325,433, 5,327,563, 5,337,357, 5,351,293, 5,341,429, 5,351,297, 5,361,359, 5,379,433, 5,392,351, 5,394,469, 5,414,850, 5,473,687, 5,490,216, 5,497,423, 5,509,074, 5,511,123, 5,524,072, 5,532,920, 5,555,304, 5,557,346, 5,557,675, 5,592,549, 5,615,264, 5,625,692, 5,638,445, 6,052,780 and 6,185,686.

Many of the aforementioned mechanisms depend to a great extent on lack of knowledge about the mechanisms by the persons attempting to modify or copy the content. With even partial knowledge, many of these mechanisms can be defeated by even a moderately technical person with access to the web where all the necessary tools and techniques are available. There is a need for security methods that do not depend solely upon their secrecy or obscurity in order to be effective.

SUMMARY OF THE INVENTION

To address the limitations of the conventional approaches described above, the present invention is directed to a digital content security method and system that does not depend solely upon secrecy or obscurity in order to be effective.

In one aspect, the present invention is directed to a system and method for storing encrypted data, subdivided into arbitrarily small collections of bits within other files, or between them, or outside a file system's known storage areas entirely. The data size used in the discussion below is 4-bit nibbles and 8-bit bytes, but it should be noted that any data size is applicable to the principles of the present invention. The location for the information is arrived at algorithmically, and no single individual location is inherently secret, but knowledge of the totality of the locations and their order of traversal is critical. The content is encrypted, but before being encrypted, each 8-bit word or byte is broken down into 4-bit nibbles, and is merged 4 bits at a time with a completely unrelated stream of bits, which may also themselves be equally meaningful 4-bit nibbles. Such interleaved multiplexing is not limited to the two-way example above, but may be considered N-way, where N is an arbitrary positive integer of any size.

In another aspect of the present invention, the locations are not dynamically arrived at but are rather chosen by a mapping process and an encoded location map is generated. This map may be itself encrypted, then subdivided into 4-bit nibbles or 8-bit bytes and itself hidden.

In another aspect of the present invention, any encrypted file is locked by taking its decryption key and then encrypting that key using another encryption method or key. The encrypted key is placed in a known location, such as the beginning, end, or at a known offset within the file, or is subdivided into bits and scattered into the file in known, and therefore retrievable, locations. The locked file itself may then be subdivided, multiplexed, further encrypted, and hidden, as needed.

In another aspect of the present invention, content can be replaced with translocated content, such that, in the example of executable content, the file a.exe is replaced with another file a.exe. The contents of a.exe are encrypted, locked, and hidden as described above. Upon execution of a.exe the content is retrieved, decrypted if necessary, executed as desired. This is not to imply a limitation to executable software content such as .exe files; all other digital content, such as an audio a.wav file, can have one or more associations in preference order, with execution environments such as a variety of MP3 or audio software players. The playback environment can be provided within the secured entity, or can be something that was always resident on the system prior to installation of the secured entity.

In another aspect of the present invention, digital content (whether or not it is also hidden and/or encrypted) is modified such that it is tokenized or otherwise obfuscated, and then when it comes time for the content to be used, it is interpreted within a custom interpreter that is a part of the system. An example of such is to modify a compiler such that the assembly language output is nonstandard, and thus require that the execution occur in an interpreter designed for the task. Such construction is possible even using decades-old utilities such as LEXX and YaCC, traditionally compiler creation tools. Such an interpreter is composed of a parser which consumes tokens, converts the tokenized logic to native computing instructions, obfuscates these instructions with anti-disassembly logic, and feeds them to the standard system interfaces. Such interposition of execution layers makes debugging a nontrivial task, and the anti-disassembly logic eliminates the use of many popular disassembly tools In another aspect, the present invention employs saturation "chaff" logic to create a large amount of harmless and meaningless (yet utterly real in appearance and content, and apparently meaningful) information designed to saturate or confuse logging, reverse engineering, and debugging tools. Such logic can be targeted at specific systems, such that large amounts of I/O to the CD device can be used to mask any meaningful activity that may also be occurring on a device. The saturation invention is particularly useful against attempts to reverse engineer a protection system by monitoring its activity, because any such eventual logging/journal output of these tools must be reviewed and interpreted by human beings, and the overall volume (instead of 100 or 500 lines of logging on a device in a few minutes, this invention can generate tens of thousands of spurious log events in the same time period) can make it difficult or impossible to sort out the useful information from the chaff.

In another aspect, the present invention prevents sophisticated monitoring tools from monitoring and logging file access. This is accomplished by creating a driver extension layer, referred to as a "shim", and attaching it to all appropriate operating system interfaces. Note that these shim interfaces on most consumer computer operating systems allow chaining, so that multiple layers can be stacked dynamically. This is also commonly called "hooking" on Windows operating systems. The present invention provides security by selecting where to hook (whether you choose to hook before or after a monitoring shim/hooking tool, such as FileMon, is significant; one can even hook both before AND after, to provide the tool with spurious input information). The mechanism rehooks at the desired depth(s) with variable frequency to defeat subsequent monitoring tool invocations.

In another aspect the present invention creates a driver extension layer, and shims or hooks the all relevant operating system interfaces, (and re-attach as above if desired). In this aspect, access filtering capabilities are employed to alter access to secured content, or to security-threat content.

In another aspect, the present invention employs an authorization process, which serves as a significant part of the decision in determining the status and origins of a task or process on the system and make an access determination.

In another aspect, the present invention includes an "assassin" construct; a system entity that operates to monitor activity and take action as needed. If, for example, the system were composed of multiple processes, one or more of which were protective by nature, and someone were to kill or stop one of the protective processes, an assassin process would take note of that occurrence, and would take action. The authorization process described below is a significant part of this decision in determining the status and origins of a task or process on the system. Such action might include disabling the rest of the system to prevent tampering, or killing the tampering process, or both. Assassin constructs are most useful if they serve some other purpose essential to the system, such as if, in the example above, the assassin process also served as a system's decryption service, such that killing the assassin would result in loss of ability to decrypt by the system, guaranteeing failure. Such assassin processes can detect the existence of specific tools both dormant and active, and prohibit the protective system's exposure to them.

In another aspect, the present invention includes an "authorization" construct. Such a process is aware of how the operating system tracks the lineage of processes and tasks, and can determine parentage quickly and accurately, so that is can be used to authorize file accesses to appropriate subtasks of an authorized task. On many operating systems the level of identification required by the system is insufficient so this aspect of the invention can bypass system query utilities and instead walk the system's process memory and track the lineage, creation, and deletion of processes and tasks.

In view of the above, the present invention is first directed to a system and method for preventing unauthorized use of digital content data. Digital content data is subdivided into data segments. The data segments are modified with second data to generate modified data. The modified data are then stored at predetermined memory locations.

It is noted that the digital content data may comprise any form of digital data that is stored, transmitted, or utilized on or between computer systems of all types. Such data includes, but is not limited to, audio, video, documents, electronic text and software and the like.

The data segments are preferably of a variable length, and the second data preferably comprises a randomly generated data stream. The second data may optionally comprise portions of the digital content data.

The modified data may likewise be encrypted and stored, for example with an encryption key, which, may in turn itself be encrypted. The encryption key may be stored with the encrypted modified data at the predetermined memory locations, and may be partitioned among the encrypted modified data.

The digital content data may comprise first and second digital content data, wherein the predetermined memory locations are selected as combinations of the locations at which the first and second digital content data were originally stored. A map of locations at which the modified data is stored may be generated and stored at the predetermined memory locations.

In a preferred embodiment, the memory locations reside on a system and the system is scanned to determine available memory locations. Target memory locations within the available memory locations at which to store the modified data are determined. The modified data is then stored at the target memory locations. The available memory locations may be located within file system locations and outside file system locations.

Modification of the data segments preferably comprises interleaving the data segments with the second data to generate interleaved data. The second data may be tokenized, for example with lexical equivalents of assembly language commands. The lexical equivalents may be consumed by a system interpreter, in turn generating alternative assembly language commands selected to obfuscate the digital content data in the event of an unauthorized access.

The present invention is also directed to a method and system for preventing unauthorized use of digital content data in a system having memory locations comprising. Digital content data is subdivided into data segments, which are, in turn, modified with second data to generate modified data. The system is scanned to determine available memory locations and target memory locations within the available memory locations at which to store the modified data are selected. The modified data are then stored at the target memory locations.

The present invention is further directed to a method and system for preventing unauthorized use of digital content data hosted on a system. Digital content data is modified with saturation data to generate modified data, and the modified data are stored at predetermined memory locations on the system to deter unauthorized access of the digital content data.

In a preferred embodiment, it is determined whether an unauthorized attempt at accessing the digital content data occurs, and in the event of unauthorized access, saturation traffic is generated on the system to deter the unauthorized activity. The saturation traffic may comprise commands that burden system resources, for example as a function of activity utilizing the system resources subject to the unauthorized access.

The present invention is further directed to a method and system for preventing unauthorized use of digital content data hosted on a system wherein a table of contents identifies files stored at memory locations of the system. A first memory location referring to a location at which at which first data file is stored is identified at the table of contents. The first memory location in the table of contents is then modified to refer to a second data file at a second location. Upon an attempt at access by the system of the first data file, the second data file is accessed if the attempt is unauthorized.

In an alternative embodiment, the first data file is replaced with the second data file and upon an attempt at access by the system of the first data file, the second data file is accessed if the attempt is unauthorized.

The present invention is further directed to a method and system for preventing unauthorized use of digital content data hosted on a system. An operating system interface of the system is monitored to determine access of operating system resources. A shim is repeatedly generated on the operating system interface to deter unauthorized access of the digital content data.

The present invention is further directed to a method and system for preventing unauthorized use of digital content data hosted on a system wherein a portion of the digital content data is substituted with token data to generate tokenized data. The tokenized data are stored at predetermined memory locations on the system to deter unauthorized access of the digital content data.

The present invention is further directed to a method and system for preventing unauthorized use of digital content data hosted on a system wherein an operating system interface operating on the system and the digital content data at an assassin process are monitored to determine whether an unauthorized attempt at accessing the digital content data occurs. In the event of unauthorized access, the unauthorized access is deterred and communicated to the operating system interface.

The present invention is further directed to a method and system for preventing unauthorized use of digital content data in a system having memory locations wherein the system is scanned to determine available memory locations based on a file system identifying locations of files on the system. Target memory locations are determined within the available memory locations at which to store the digital content data. The digital content data is stored at the target memory locations.

In another aspect, the present invention includes a software development kit and toolkit, which embodies the aspects of the inventions described above and allows for their application to target content without revealing the details of the construct methods to the user.

The present invention is thus further directed to a system for preventing unauthorized use of digital content data in a system having memory locations wherein the system enables a user to select from a plurality of tool modules, each module providing a service for protecting digital content from unauthorized use such that a user can protect digital content. The tool modules may comprise modules that perform functions selected from the group of functions consisting of: interleaving; tokenization; obfuscation; saturation; translocation; shimming and assassination.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention

DETAILED DESCRIPTION OF PREFERRED EMBODIMENTS

The present invention will be more completely understood by means of the following detailed description, which should be read in conjunction with the attached drawings, FIG. 1 through FIG. 26, in which similar reference numbers indicate similar structures.

Figure 1:
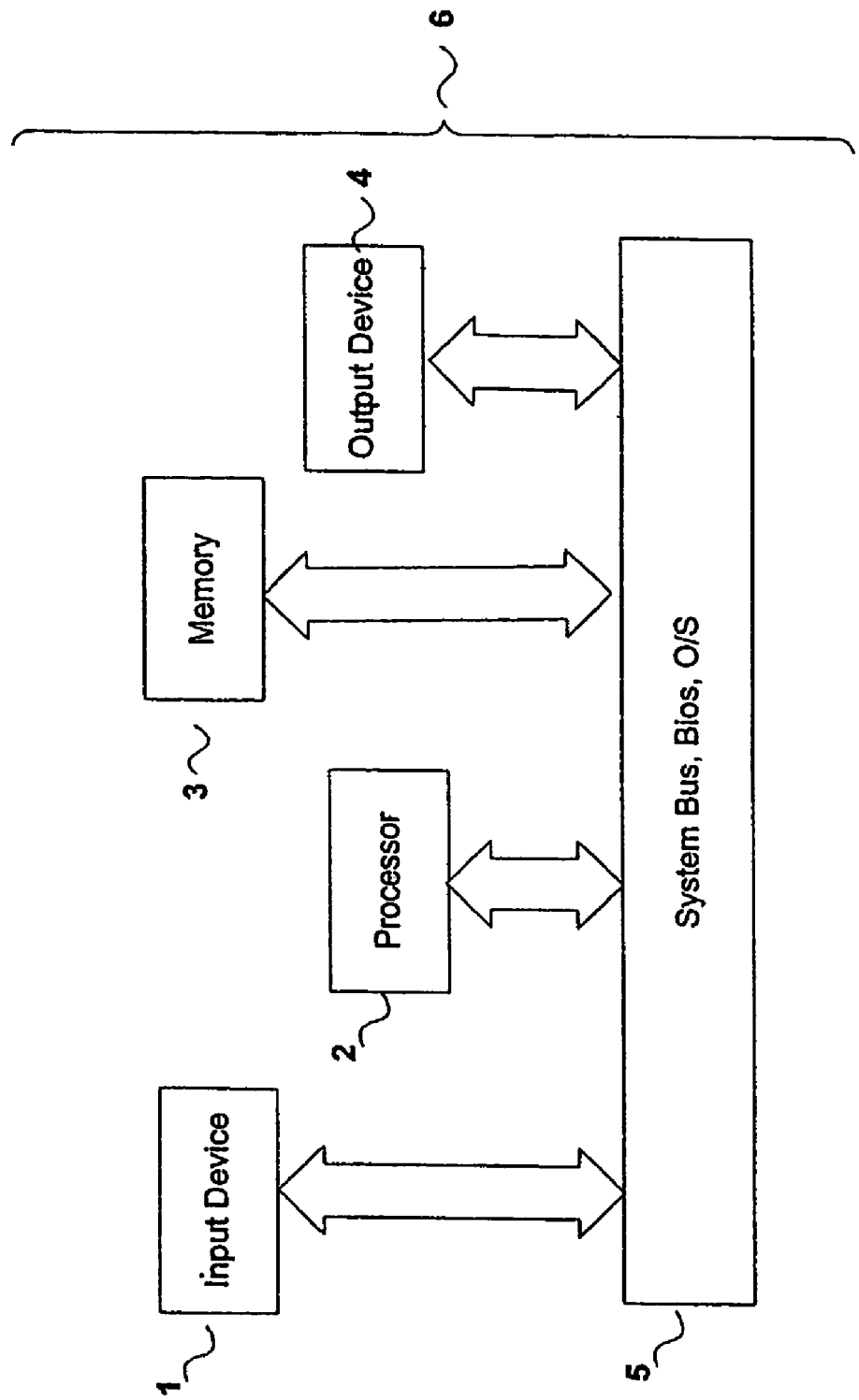
FIG. 1 is a block diagram of a computer system or consumer computerized appliance device to provide an understanding of how the systems and methods of the invention interact with such devices.

This invention and its embodiments may be implemented on a personal computer or general purpose digital computer as shown in FIG. 1, including, but not limited to, single- or multiple-processor-based Windows, Linux or Macintosh desktop computers such as those found with increasing frequency in contemporary homes and offices. Embodiments of this invention may also be implemented on a digital processing circuit, including, but not limited to, those found in CD and DVD consumer audio/video appliance components or systems, stationary or mobile applications. Embodiments of this invention are also well suited for implementation on other computing appliance devices such as hard-disk or random access memory based video and audio entertainment appliances which may be digital-processing-circuit based, or may be based on general-purpose digital computing architectures. As can be made clear to one skilled in the art, this invention is applicable to all digital content uses, because all such uses have the same basic elements; the content 7 is input to the system in some fashion as shown in FIG. 2, stored for some period of time in the system's memory 8 (whether disk, volatile RAM of any kind, or non-volatile RAM of any kind), and executed on a processor 9, whether the main processor of the system, or an auxiliary processor, and whether the content itself is directly executable on the processor or is executed within a helper application (such as an audio, video, or word processing application, depending on content type).

The systems and methods of the present invention may be embodied and implemented on a general-purpose digital computer or personal computer system 6 as shown in FIG. 1. Such a system commonly includes an input device 1 (one or more may be connected; this includes anything which provides external content and data to the computer as input, such as a mouse or keyboard or scanner). Such a computer system 6 also has as a subcomponent a collection of software and hardware components 5 that comprise the processor, all system bus and cache lines, and the running operating system and all of its subcomponents. Output is presented to the user via one or more output devices 4, which include, but are not limited to, the computer's display (CRT or LCD) and the hardware that drives it, and can also include printers, speakers and sound cards, and radio frequency, S-video, component, or digital video outputs for consumer/entertainment applications and devices.

The computer system 6 may be a general purpose home or office or mobile computer system. Such systems allow for the usage/consumption/execution of a variety of forms of digital content; the invention disclosed herein can be applied to all forms of such digital content and the foregoing will describe some of the forms of this content on this computing platform family. Such systems are generally multiple-component level hardware-based systems, comprised of a motherboard or main-board, with various specialized components (such as I/O cards, video cards, processors, memory) attached to it by means of connectors. Each such card and the motherboard itself and the attached components have some amount of executable firmware located on various non-volatile memory 3 integrated circuit components, but the majority of the system's operational logic is driven by executable operating system code that is stored on media (non-removable or removable magnetic and or optical media, or non-volatile random access memory media). Usually on a system of this general type such executable code is created by software developers and is written using program code in modern programming languages such as C and C++. Such languages are programmatically compiled into assembly language or machine instruction code and are later executed directly on the system's central processing unit. Other programming languages and techniques, such as those used in Java, JavaScript, and Visual Basic, are interpreted at runtime; they're stored in their original language, or in a moderately tokenized version of their original language, and are then rendered on the fly at execution time into assembly language or machine instruction code and are later executed directly on the system's central processing unit. Other forms of relevant digital content utilized on such a computer system are audio (for example .wav or .mp3 file formats), video (for example .avi file format), e-book and documentation (for example .pdf or variant secure-portable-document-format), and all such content may be significantly security-enhanced by the application of the invention described in this document.

Figure 2:
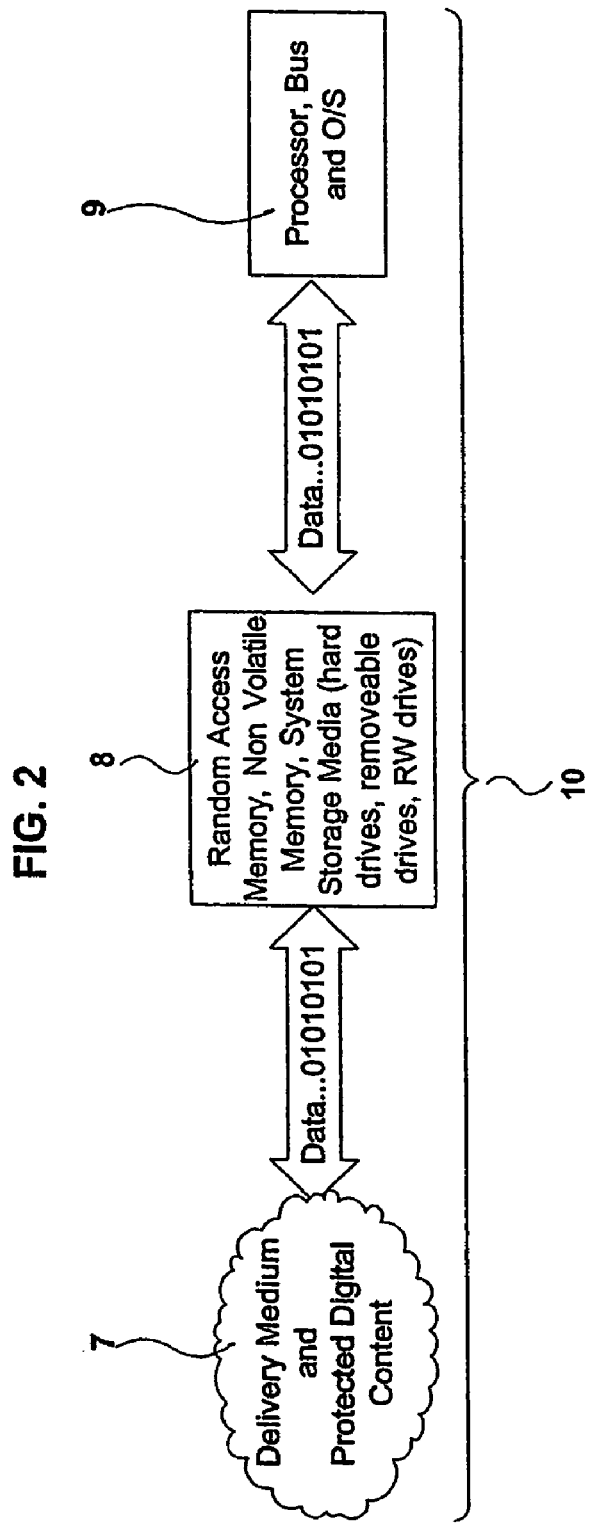
FIG. 2 is a diagram demonstrating the flow of digital content from its delivery media through a computer system such as the one in FIG. 1, in accordance with the present invention.

As shown in FIG. 2, a computing system 10 of any kind, whether a general purpose computer 6 (see FIG. 1) or an appliance device with computing capability and components (such as a DVD or CD player) is commonly used to consume, execute, display or otherwise utilize digital content. Digital content 7 (including but not limited to the above examples) is made available to the system by a variety of means including by network transmission (internet or intranet), on hard media, on non-volatile random access memory removable storage (such as the compact flash standard for removable media storage cards); and is read from that media 7 into the system's memory 8. In the case of such content which is unprotected, the utilization model is straightforward; it is read from the input media 7 into memory 8 and then executed at some point thereafter. This document will define the word "executed" to mean, in the case of binary executable program content (for example a computer video game, or a game console video game running on a game console computing appliance device, or a word processing program intended to run on a general purpose computing device), executed on the processor 2 as a program; in the case of readable document formats (for example a Word .doc file or an Acrobat .pdf file) executed within the appropriate application, which in turn executes on the processor 2 as a program; in the case of all other digital content types (for example audio, video) they too are intended to be input to an appropriate application (for example on a general purpose computing device, a software application such as Windows Media Player; in the case of a computing appliance device such as a DVD player or a game console, a firmware executable which runs on a processor 2 within the computing appliance device) which in turn executes on a processor 2 within the computing platform. Also note that within this document the term "stream" may be used interchangeably with the term "file" to represent a collection of bits that represent some form of digital content, including not limited to standard file types found on operating systems such as Windows and archive or container formats used to convey content on the internet such as "ZIP" files or "TAR" files.

Figure 3:
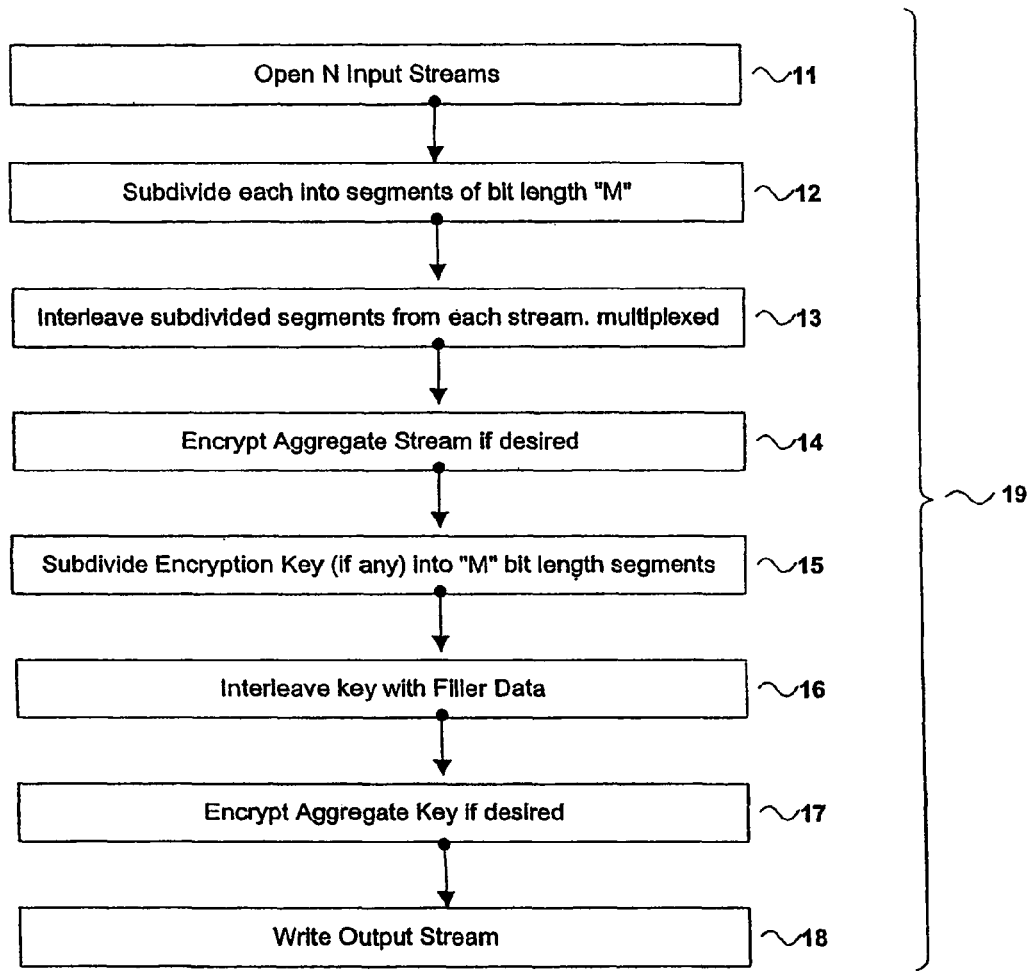
FIG. 3 is a flow diagram that describes the creation of an interleaved, multiplexed, encrypted content stream such as those used for information hiding and content watermarking, in accordance with the present invention.

In one embodiment of this invention, illustrated in FIG. 3, an interleaved-multiplexed data hiding process 19 (optionally, also, an excellent framework for the application of encryption to the interleaved, multiplexed content) is provided that performs multiple functions detailed in the foregoing paragraphs. The system and process of the present invention create meaningful (optionally encrypted) data-identifier tags, sometimes referred to as watermarks, for later insertion into content, of any desired size in number of bytes, each of which have an individual variation even when the identifier data is identical for each. Data content is first input as shown in step 11. Watermarks are defined as composed of a variable number of bits 12. These collections of bits are re-ordered as needed and interleaved at step 13 with other data, that is either randomly generated, or time-stamped, to create a unique numeric value. Alternatively, the collections of bits can be interleaved at step 13 with data streamed directly from other portions input data content 11 itself, to be hidden in the watermark. A simple verification value is incorporated into the watermark data or the interleaved-multiplexed data stream such that any instance of a watermark may be examined to determine if it has been tampered with. Following this, the resultant stream is output and written to predetermined memory locations at step 18 either at locations as selected in the mapping process outlined elsewhere in this document or any other locations specified by the system.

Prior to writing the output stream, the watermark may optionally be encrypted by a key to further enhance its security. The encryption key itself can also be optionally encrypted in a similar manner in steps 15 (subdivide into segments) 16 (interleave) and 17 (encrypt), and optionally stored in a known location with the data stream 18.

An example of the resultant effect of the system and method of the invention is provided in the following illustration. Assume an identifier 1234 11 that is to be hidden in 100 locations on a game CD (see description below in connection with FIG. 6, FIG. 7, FIG. 8 for details related to where and how the invention elects to hide such data). Assume also a subdivision size of 8 bits, and a total number of streams to be interleaved at 2 streams. The example of this method takes the bytes of the identifier, in this case the bytes "1", "2", "3", and "4" 12 and interleaves them with a second stream of bytes 13. These four divided subcomponents are then interleaved 13 with some other data; in this example the data comes from the text of this sentence beginning with "These four divided" 11. Thus the first watermark generated would be "T1h2e3s4" 13 and the second watermark would be "e1 2f3o4" 13. Even in clear that the two watermarks have a different appearance and would not be trivially searchable; however when optionally encrypted at step 14 they become utterly dissimilar, yielding the values "aJt6G2.R" and ">*qI1Ub$" in this example; these two values, hidden (see FIG. 6) or stored in the file system (see FIG. 4) would be quite secure, yet each is easily locatable by means of this invention (the location process is described with reference to FIG. 7, below), and once located, each is easily translatable using the invention components described with reference to FIG. 7 back into the identifier "1234".

Figure 7:
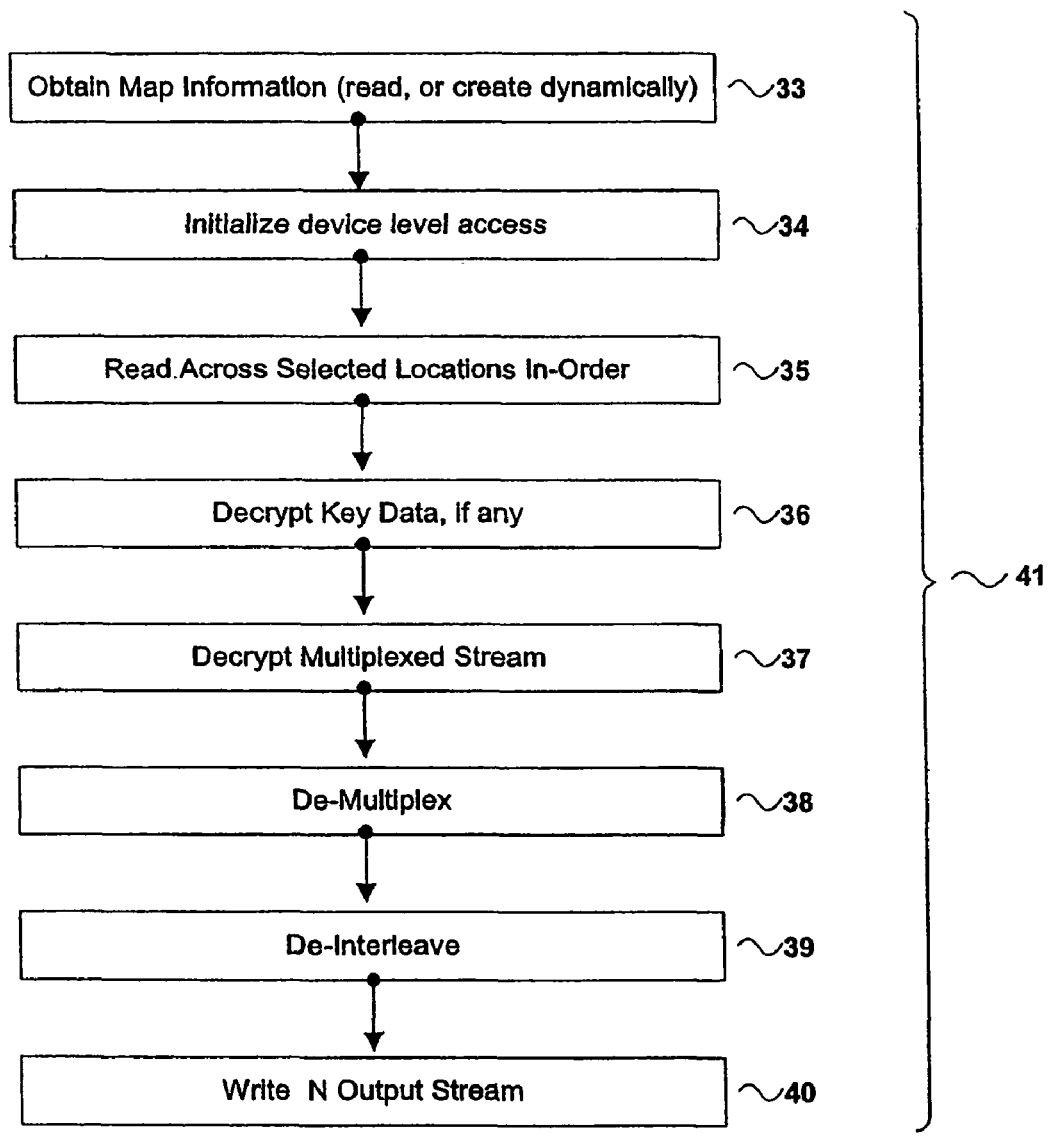
FIG. 7 is a flow diagram illustrating a method for retrieving such hidden, stored content, in accordance with the present invention.

The present invention, illustrated in FIG. 3, also serves as a means of interleaving N streams of data for purposes far more general, and more broadly useful, than simply watermarking content. It can irrevocably intermix 13 multiple streams 11 of content such that they remain interleaved until utilized by an appropriate component of the present invention, as illustrated in FIG. 7, below.

The following code example details an embodiment of this invention which illustrates the concepts discussed in the above paragraphs which reference FIG. 3. This embodiment is tuned to subdivide a stream of data into 8 bit bytes and then interleave them; in practice, any number of streams may be subdivided, and any subdivision value may be used.

```
// Return a sig
BOOLEAN CSigGen::GetSig(
    const BYTE*const    inp_bld,        // sig data
    const unsigned  int in_cbld,        // length of sig data
    BYTE*const      outp_bSig,          // generated sig, SigSize( ) bytes
    const DWORD         in_dateTime,    //       The date time bytes
    const int           in_sigToggle    //       Double the size of a watermark
)
{
    BYTE        abJumble[MAX_SIG_SIZE]; // buf for jumble dat
    BYTE        abSigRaw[MAX_SIG_SIZE]; // buf for in-process sig
    BOOLEAN     bStat;
    unsigned int    cbJumb;
    unsigned int    cbSig = SigSize( );    // size of gen'd sig
    unsigned int    ii;
    unsigned int    iTotal;
    unsigned int    jj;
    unsigned int cbld = min(SigSize( )/2, in_cbld);
    // Validate args
    if ( ( NULL == outp_bSig)   ||
        (cbld > cbSig)          ||
        (MAX_SIG_SIZE < cbSig) ||
                ((in_sigToggle == 1) && (in_cbld < 2*cbld)))
    {
        return FALSE;
    }
    // Get the jumble data we need
    cbJumb = (cbSig – cbld) – 1;     // subtract 1 for checksum
    if (!m_pJumbler->GetData(cbJumb, abJumble))
    {
        return FALSE;
    }
    // Compute the simple verification value of the data
    iTotal = 0;
    for (ii = 0; ii < cbld; ii++)
    {
        iTotal += (unsigned int)(inp_bld[ii + in_sigToggle*cbld]);
    }
    abJumble[cbJumb] = (BYTE)((unsigned int)0x00FF & iTotal);
    // Interleave if the sizes are right
    if ( cbld == cbSig / 2)
    {
        for (ii = 0; ii < in_cbld; ii++)
        {
            jj = 2 * ii;
            abSigRaw[jj    ] = inp_bld[ii + in_sigToggle*cbld];
            abSigRaw[jj + 1] = abJumble[ii];
        }
            if ((in_dateTime) && (cbSig >= 16) && (in_sigToggle == 0)){
                // Instead of using random data, use the date/time bytes
                abSigRaw[1] = (BYTE) (in_dateTime & 0xff);
                abSigRaw[5] = (BYTE) ((in_dateTime & 0xff00) >> 8);
                abSigRaw[9] = (BYTE) ((in_dateTime & 0xff0000) >> 16);
                abSigRaw[13] = (BYTE) ((in_dateTime & 0xff000000) >> 24);
            }
            else if ((cbSig >= 16) && (in_sigToggle == 1) && (in_cbld == cbld*2 + 4)){
                // Instead of using random data, use the date/time bytes
                abSigRaw[1] = inp_bld[16];
                abSigRaw[5] = inp_bld[17];
                abSigRaw[9] = inp_bld[18];
                abSigRaw[13] = inp_bld[19];
            }
    }
    // Otherwise, tack the jumble data on the end
    else
    {
        memcpy(abSigRaw, inp_bld, cbld);
        memcpy(&(abSigRaw[cbld]), abJumble, cbSig – cbld);
    }
    // Now encrypt it
    bStat = m_pEncryptor->EncryptBlock(abSigRaw, outp_bSig);
    // Zero the in-process sig data
    memset(abSigRaw, 0, sizeof(abSigRaw));
    // Done
    return bStat;
} // End GetSig( )
```

A simple example and embodiment of this aspect of the present invention now follows. Assume three streams of digital content, in this case three files on disk, each of five megabytes in size. File "A" is a text file. File "B" is an audio file. File "C" is a Word document; thus on a general purpose computing device 6 (see FIG. 1) Windows operating system this yields the three hypothetical input streams 11 derived from A.txt, B.wav, C.doc. Each such stream is subdivided into segments of M bits in length 12, and interleaved as in the previous example. The resultant output, even prior to encryption, is clearly incomprehensible to any mechanism other than this invention (see, for example, the operation disclosed in FIG. 7) due to the nature of the mixed text, audio, and document data. Even so, the output itself may be encrypted as in FIG. 3, steps 14, 15, 16 to further protect its contents. The aggregate stream is optionally encrypted, and then the keys necessary to decrypt this stream, if encrypted, are themselves encrypted and hidden; the manner of the hiding process may be as described in FIG. 8, examples 42, 43, 44 or 45, described in detail below, or the key may be hidden in another location known to the system as needed. This aggregate multiplexed stream, now fifteen megabytes in size may be written 18 at this time.

One embodiment of the writing process 18 streams the contents back into the original files A, B and C (see FIG. 6 and corresponding description) from where they came, without regard for which contents came from which files, such that the first five megabytes of the fifteen megabyte stream is used to fill A.txt, the second five megabytes is used to fill B.wav, and the third five megabytes is used to fill C.doc. The method used to determine where to write, to keep track of where the data was written, and to record the manner in which it was interleaved, is detailed below with reference to FIG. 6. After having written the content, the present invention supports multiple techniques for providing that the data may be later read and de-interleaved properly (see FIG. 7, below). Note that the concept of a map of locations and interleaved data information as detailed in FIG. 7 40 is optional for purposes of this aspect of the present invention. The map can be incorporated into the stored, hidden content, or as an alternative embodiment of the invention, algorithmic logic identical to that described below in FIG. 6, with the order of execution as in steps 27, 28 (described below) is incorporated into the process of the present invention such that the likely map locations can be determined based on the context and content of the media. The retrieval of segments of the stream can then be attempted the simple verification values calculated as shown in the code example above to determine that the correct data has been retrieved. The stream contents can be retrieved, decrypted, de-interleaved, and utilized.

The following example CmapLocation::WriteFile is a code example of the logic used to create such a map file of locations. Note that there are two types of maps created by the CmapLocation::WriteFile code example below: raw maps and location maps. Raw maps are built upon a linked list structure of locations and lengths and also contain detailed information about the file this mapped area was derived from. Location maps are a further abstraction, and are built upon linked lists of raw map lists, where each location map entry contains information to locate a certain number of data bytes. In the example code below, this value is 16 bytes to support the example encryption method, which is optimized for 16 bit units of data. So in the foregoing example, the location map is created from the raw map by partitioning it into 16 byte blocks. These 16 byte blocks need not be contiguous.

Figure 8:
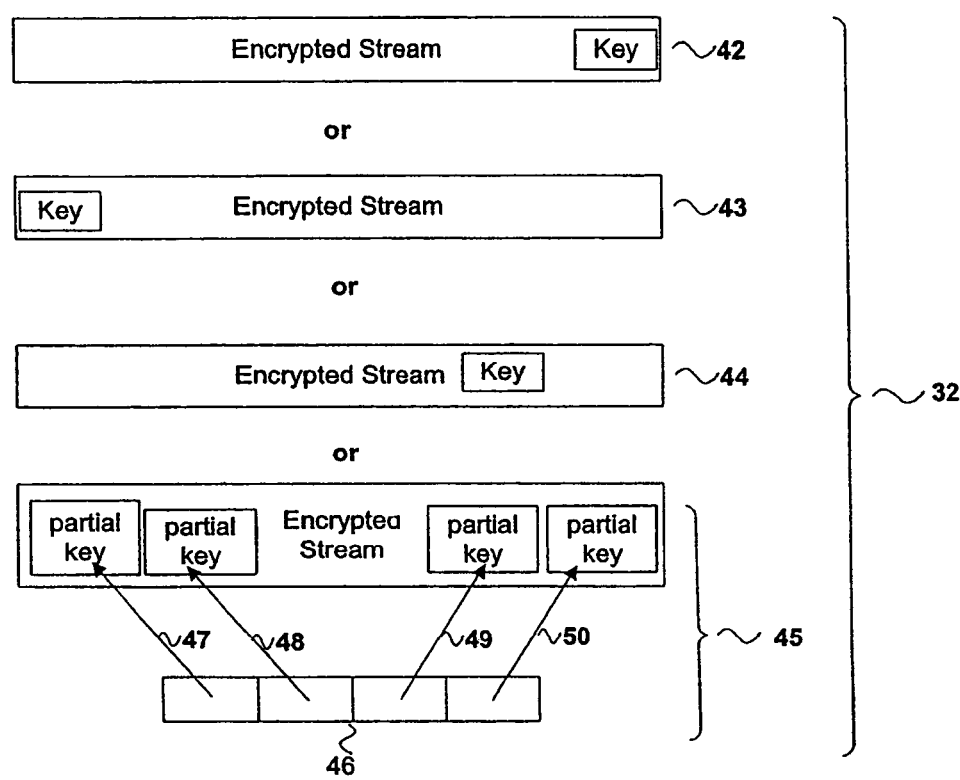
FIG. 8 is a block diagram illustrating four related methods of securing an encrypted watermark or encrypted stream, in accordance with the present invention.

Also note that the following code examples embody another aspect of this invention; namely, a file locker, a mechanism as described below with reference to FIG. 8 and touched upon in FIG. 3 steps 15, 16, 17. The file locker serves to securely marry the decryption key to an encrypted stream such that the process described in FIG. 7 can successfully unlock the data and decrypt it. The file locker further encrypts the encryption key using a secondary encryption algorithm, with a known key, and hides the key information within the encrypted stream as described below with reference to FIG. 8. The encrypted key may be hidden whole (as in steps 42, 43, and 44 of FIG. 8) or may be further subdivided and hidden in a scattered fashion (as in steps 45, 46, 47, 48, 49, and 50 of FIG. 8).

```
CMapLocation::WriteFile(
    const char*const mapFileName
)
{
    LocationMapList *   pos = locationMapList;
    MapRawList_t *      rpos;
    BYTE output[512];
    CFileLock *fileLocker;
    C2Encryptor *fileEncrypt;
    CREncryptor *fileLock;
    BYTE key[16];
    int i;
    unsigned long j;
    WORD            majorVersion = HIWORD(MAP_LOC_VERSION);
    WORD            minorVersion = LOWORD(MAP_LOC_VERSION);
    // Encryption Locker
    fileLock = new CREncryptor(MAP_LOC_KEY);
    // Generate Random key
    srand( (unsigned)time( NULL ) );
    for (i=0;i<16;i++) {
        key[i] = (char) (rand( ) / (RAND_MAX / 255));
    }
    fileEncrypt = new C2Encryptor(key, 16);
    if (mapFileName)
    {
        fileLocker = new CFileLock(fileEncrypt, key, 16, fileLock, majorVersion, minorVersion, (char *) mapFileName);
    }
    else
    {
```

```
        fileLocker = new CFileLock(fileEncrypt, key, 16, fileLock, majorVersion, minorVersion,
            "c:\\l.tmp");
    }
    // Write out location size
    fileLocker->WriteBytes((BYTE *) &(locationSize), sizeof(locationSize));
    while (pos && pos->locNumber)
    {
        if ((pos->location->length == locationSize) && (pos->link) &&
            (pos->link->location) && (pos->link->location->length == locationSize) &&
            ((pos->location->offset + pos->location->length) == pos->link->location->offset))
        {
            // Run of location map entrys
            output[0] = __MARKER;
            output[1] = LOCMAPRUN;
            fileLocker->WriteBytes(output,2);
            fileLocker->WriteBytes((BYTE *) &(pos->location->offset), sizeof(pos->location->offset));
            j = 2;
            pos = pos->link;
            while ((pos->location) && (pos->location->length == locationSize) && (pos->link) &&
                (pos->link->location) && (pos->link->location->length == locationSize) &&
                ((pos->location->offset + pos->location->length) == pos->link->location->offset))
            {
                j++;
                pos = pos->link;
            }
            pos = pos->link;
            // Write out number of entries in this run
            fileLocker->WriteBytes((BYTE *) &(j), sizeof(j));
        }
        else
        {
            // Normal location map entry
            output[0] = __MARKER;
            output[1] = LOCMAPENTRY;
            fileLocker->WriteBytes(output,2);
            fileLocker->WriteBytes((BYTE *) &( pos->locNumber), sizeof(pos->locNumber));
            rpos = pos->location;
            while (rpos) {
                if (rpos->length > 0)
                {
                    output[0] = __MARKER;
                    output[1] = LOCMAPLOC;
                    fileLocker->WriteBytes(output,2);
                    fileLocker->WriteBytes((BYTE *) &(rpos->offset), sizeof(rpos->offset));
                    fileLocker->WriteBytes((BYTE *) &(rpos->length), sizeof(rpos->length));
                }
                rpos = rpos->link;
            }
            pos = pos->link;
        }
    }
    output[0] = 0;
    fileLocker->WriteBytes(output, 1); // Write a null byte out at the end of the file
                                        // to cause read back of file to end
    delete fileLocker;
    delete fileEncrypt;
    delete fileLock;
}
CMapRaw::WriteFile(
    const char*const mapFileName
)
{
    MapRawList_t *pos = m_rawMapList;
    BYTE output[512];
    CFileLock *fileLocker;
    C2Encryptor *fileEncrypt;
    CREncryptor *fileLock;
    BYTE key[16];
    WORD stringLength;
    int i;
    WORD            majorVersion = HIWORD(MAP_RAW_VERSION);
    WORD            minorVersion = LOWORD(MAP_RAW_VERSION);
    // Locker
    fileLock = new CrEncryptor(MAP_RAW_KEY);
    // Generate Random key
    srand( (unsigned)time( NULL ) );
    for (i=0;i<16;i++) {
        key[i] = (char) (rand( ) / (RAND_MAX / 255));
    }
    fileEncrypt = new C2Encryptor(key, 16);
```

```
    if (mapFileName)
    {
        fileLocker = new CFileLock(fileEncrypt, key, 16, fileLock, majorVersion,
            minorVersion, (char *) mapFileName);
    }
    else
    {
        fileLocker = new CFileLock(fileEncrypt, key, 16, fileLock, majorVersion,
            minorVersion, "c:\\r.tmp");
    }
    while (pos)
    {
        if (pos->length > 0)
        {
            if (pos->name)
            {
                output[0] = __MARKER;
                output[1] = FILENAMETAG;
                fileLocker->WriteBytes(output,2);
                stringLength = strlen(pos->name);
                fileLocker->WriteBytes((BYTE *) &stringLength, sizeof(WORD));
                fileLocker->WriteBytes((BYTE *) pos->name, stringLength);
            }
            if (pos->fileStartAddress) {
                output[0] = __MARKER;
                output[1] = FILEINFOTAG;
                fileLocker->WriteBytes(output,2);
                fileLocker->WriteBytes((BYTE *) &(pos->fileStartAddress), sizeof(pos->
fileStartAddress));
                fileLocker->WriteBytes((BYTE *) &(pos->fileLength), sizeof(pos->fileLength));
            }
            output[0] = __MARKER;
            output[1] = RAWMAPENTRY;
            fileLocker->WriteBytes(output,2);
            fileLocker->WriteBytes((BYTE *) &(pos->offset), sizeof(pos->offset));
            fileLocker->WriteBytes((BYTE *) &(pos->length), sizeof(pos->length));
            output[0] = pos->flags;
            fileLocker->WriteBytes(output, 1);
        }
        pos = pos->link;
    }
    delete fileLocker;
    delete fileEncrypt;
    delete fileLock;
    //fclose(m__rawFile);
}
```

Figure 4:
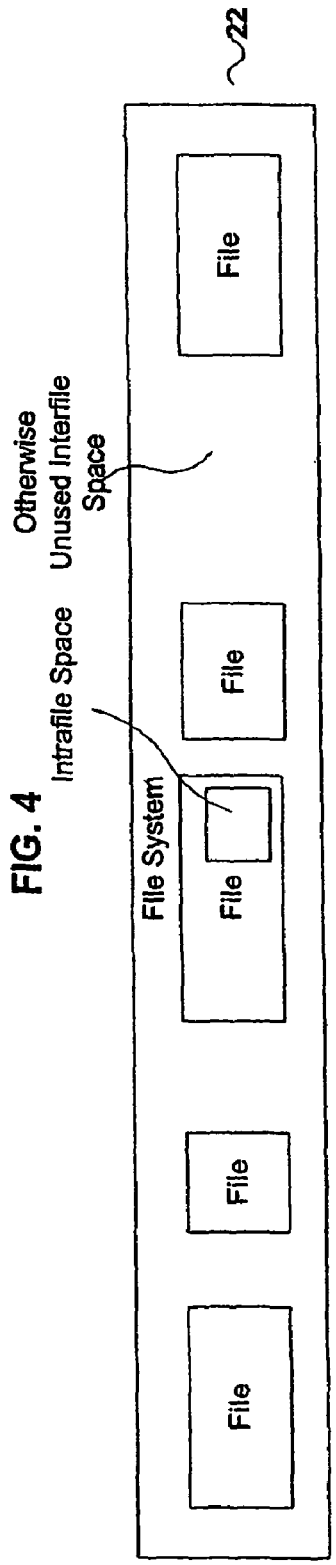
FIG. 4 is a block diagram illustrating the placement of hidden, stored content, in accordance with the present invention.

With reference to FIG. 4, the present invention includes a system and method by which content can be hidden or stored in a variety of locations, both intrafile (within a file) and interfile (between files) and also outside the file system on devices that support extra-files system access (such as ISO-9660 CD discs). The map files in the code example above detail how such locations are represented and communicated.

Figure 5:
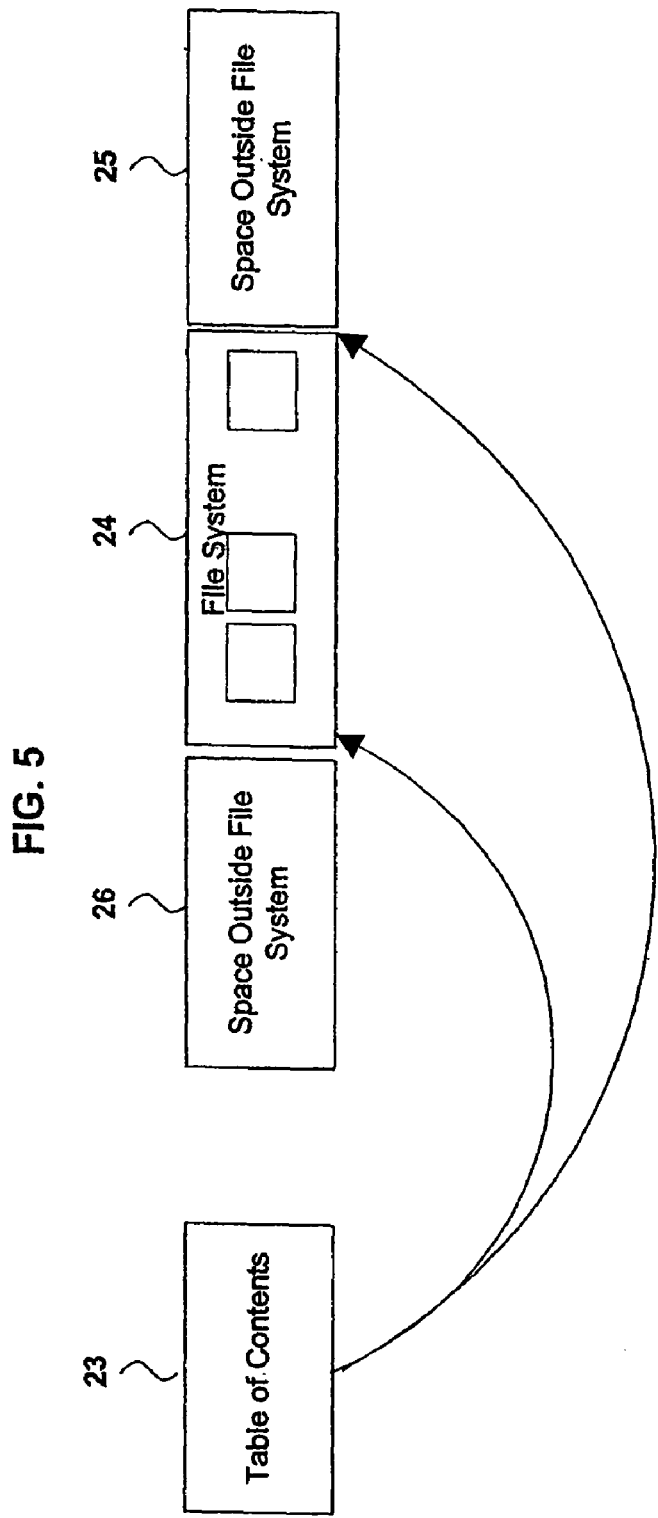
FIG. 5 is a block diagram illustrating an alternative or additional placement method for hidden, stored content, in accordance with the present invention.

The operation for choosing the actual locations will now be described with reference to FIG. 5. Note that in FIG. 5 the extra-file system locations 26, 25 are excellent locations to store content securely, because application programs generally cannot access the raw data and are limited to accessing only those data items that are located within the bounds of the file system 24 as known to the table of contents 23. All application file system accesses through normal interfaces, for example the Windows application interfaces to Read( ) Open( ) and Close( ) a file, require a file handle or descriptor, which means that most applications can only access areas of the file system known to the table of contents FIG. 5 23. Thus, on any supported file system format, for example ISO-9660, liberal use is made of any extra-file system space that may be available.

Figure 6:
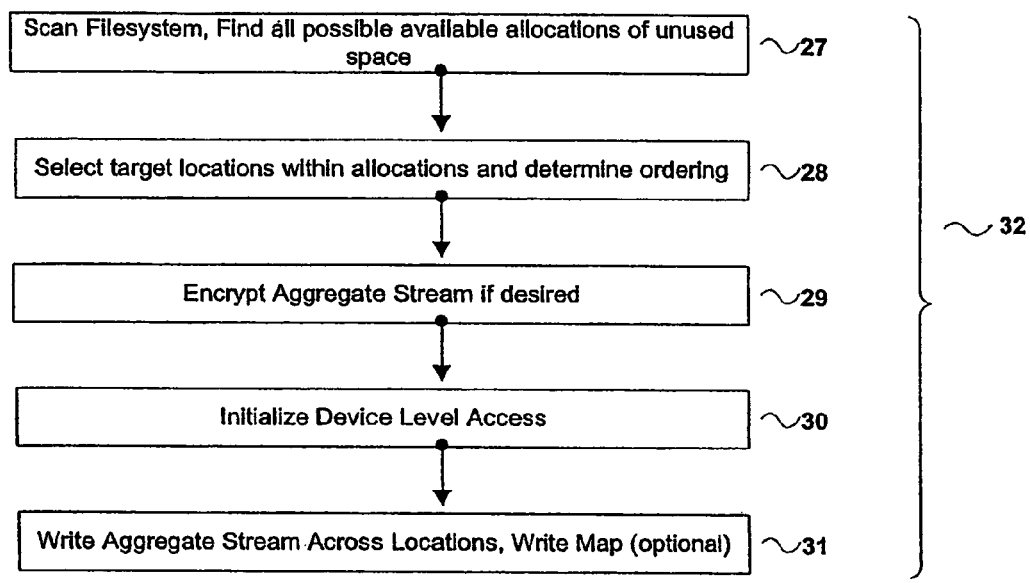
FIG. 6 is a flow diagram illustrating the storage of digital content in a hidden, secure manner, in accordance with the present invention.

With reference to FIG. 6, an aspect of the present invention is disclosed that is used to hide or store information in secure or non-obvious locations. In a first step of this aspect, the file system is scanned all the possible locations appropriate for information hiding are determined 27. Desired locations from among all the possible locations 28 are selected the ordering of insertion into these locations 28 is determined. The stream of interleaved data, described above with reference to FIG. 3, may optionally be encrypted as desired 29. Next, low-level operating system interfaces are accessed and device level access 30 is initialized at a level far below the normal file system interfaces, such that the device may optionally be addressed in any and all valid raw physical locations, whether inside or outside the standard file system. In step 31, the aggregate stream is written across the target locations in the order chosen in step 28. An optional map of these target locations may be produced for later access by other aspects of the present invention that may not contain the algorithmic knowledge to determine those locations without such a map.

FIG. 7 is a flow diagram illustrating a method by which the hidden, stored content is retrieved, for example information previously hidden in secure or non-obvious locations as shown in FIG. 6. In this process, the information is retrieved and reassembled into its original form and provided as needed to other system components. In determining the possible locations where such information could be hidden, there are, for example, two possible initial sets of actions 33; either obtain the map information previously hidden according to step 28 of FIG. 6, or generate a valid retrieval map as an equivalent of the storage map by incorporating the same algorithmic storage logic as retrieval logic, for example the process employed in FIG. 6: determine all possible locations 27, select the chosen locations and ordering 28, and create the retrieval map equivalent of a storage map.

Low-level operating system interfaces are accessed, and device level access is initialized 34 at a level far below the normal file system interfaces, such that the device may be addressed in any and all valid raw physical locations, whether inside or outside the standard file system. The map or map information obtained above at step 33 is used to determine the ordering or reading and the read locations, and these locations are read in order 35. The items read are concatenated in the order read to re-create the original multiplexed interleaved stream. If decrypted previously, the decryption key is read, either from the map 33 or from a predetermined location which may be at the beginning of the encrypted stream 43 (see FIG. 8), at the end of the encrypted stream 42, at a predetermined offset within the stream 44, or subdivided and hidden at predetermined offsets 47, 48, 49, 50 within the encrypted stream 45, and is itself decrypted at step 36 of FIG. 7. The stream itself is decrypted 37 as desired. The stream is de-multiplexed into its component original streams 38. Each component stream is subdivided into a number of segments of a predetermined number of bits in length and each segment is then de-interleaved 39 into its original component input stream. Each such stream is then written to the file system 40 or otherwise provided to the system.

Returning to FIG. 4 the Intrafile space 20, or space within the bounds of a file, is space that is usually specified as "unused" or "reserved for future use" in the specifications for the file or stream types. The following list of published specifications represent a sampling of those researched to determine space utilization within various types of files:

"Peering Inside the PE: A Tour of the Win32 Portable Executable File Format", Matt Pietrek, March 1994
"BMP Format: Windows Bitmap File Format Specifications", Wim Wouters, May 2000
Appnote.txt from the PKZip Website
The ISO-ITU JPEG standard in a file called itu-1150.ps
CRYX's note about the JPEG decoding algorithm. Copyright 1999 Cristi Cuturicu.
Inside Windows Cabinet Files by Sven B. Schreiber Using this research data, and proprietary data collected manually by examining many available file types, the present invention embodies a set of programmatic rules that represent techniques for placing data within all the known safe locations (see FIG. 6, step 27) to store protected (interleaved and/or multiplexed and/or encrypted) data in all tested file types, and once hidden, the present invention provides a similar inverse set of capabilities (see FIG. 7) that provide mechanisms to find the hidden information (see steps 33 34 35), extract it (see steps 36 37 38 39) and provide the decrypted, de-interleaved data to the requestor at step 40 of FIG. 7.

The following code example illustrates an embodiment of the invention described above and the programmatic rules illustrated above and with reference to FIG. 6. Each type of file (for instance text files, jpeg photographs, GIF web images, executable "exe" or PE files, any and all types of files known to the operating system), have specific rules within this invention associated with them. The code example below shows the logic used to determine the available free space within a given file. One of the parameters is a call-back process (writeMapLocation) which creates a list of available locations in the form of a map structure (sometimes called a "raw" map). The second parameter is the current MapRawList to which the informative list is to be written. The method used to determine the byte locations to pass to writeMapLocation varies for each file type (BMP, EXE, etc).

```
CBMPFile::GetMapLocations(
    void (*writeMapLocation) (unsigned long,unsigned long, bool, bool,
bool, MapRawList_t **),
    MapRawList_t **rawMapTail
)
{
    unsigned long i;
    unsigned long pos = startLocation + STARTOFPALETTE +
(PALETTE_ENTRY_SIZE – 1);
    for (i=0;i<paletteEntries;i++)
    {
        (*writeMapLocation) (pos, 1, false, true, true, rawMapTail);
        pos += PALETTE_ENTRY_SIZE;
    }
}
//
// FUNCTION: WriteMapLocations(unsigned long offset, unsigned
long length)
//
// PURPOSE: Added the given locations to the RawMapList
//
// COMMENTS:
//
//
void WriteMapLocations(
    unsigned long   offset,
    unsigned long   length,
    bool            isNonZero,
    bool            isAlwaysFindable,
    bool            isInsideFile,
    MapRawList_t ** rawMapTail
)
{
    BYTE flags = 0;
    if (length == 0)
        return;
    if (isNonZero)
        flags |= ISNONZEROFLAG;
    if (isAlwaysFindable)
        flags |= ISALWAYSFINDABLEFLAG;
    if (isInsideFile)
        flags |= ISINSIDEFILEFLAG;
    (*rawMapTail)->offset = offset;
    (*rawMapTail)->length = length;
    (*rawMapTail)->flags = flags;
    (*rawMapTail)->link = (MapRawList_t *) malloc
(sizeof(MapRawList_t));
    *rawMapTail = (*rawMapTail)->link;
    InitMapRawEntry(*rawMapTail);
}
```

In another embodiment of this invention illustrated in FIG. 9, content is placed in various locations and then protected using a technique referred to as translocation, a process that is described in further detail below. Prior to discussing the concept of translocation, it is necessary to first describe the nature of such locations for the placement of such information. Such information may be executable content such as a Windows program, for example notepad.exe, or may take the form of other content, for example, a text file, a movie, or an audio file or music. The file system consists of storage space on one or more devices and a table of contents or directory that provides locations and offsets. There are multiple embodiments of this invention with alternate strategies for placement which may be used individually or in combination. Note that content may be placed as follows in whole or in part, since hiding even part of complex content may render the remainder useless, such that the first 25% of a given content type can be hidden and the remainder is made secure by the lack of the hidden part, even though the remainder is accessible.

In one such implementation, content may be placed within the file system 65 but hidden between the files 56 in space, for example, that is created by the fragmentation of predetermined storage blocks on the storage media such that the files visible in the file system do not entirely occupy the space allocated for them. Such content is placed in unused between-file fragmentation space within the bounds of the file system 56 such that its location is unknown to the table of contents 54 so that no file system access at the file level will be able to locate or access the files. This type of information hiding may require the information be subdivided into small parts and hidden in multiple smaller locations, since the available space between files may be fragmented.

In another embodiment 66 such content may be placed outside the file system entirely 59. In this implementation, the amount of contiguous available space is larger and thus such a file may be placed in contiguous locations, however note that such a file may in fact still be subdivided and placed into multiple disordered discontiguous locations for added security even in the abundant contiguous space in such extra-file system 59 locations.

In an alternative embodiment 67, the content is placed partly between the files within the file system 62, and partly in space outside the file system, namely the extra-file system 63.

Figure 9:
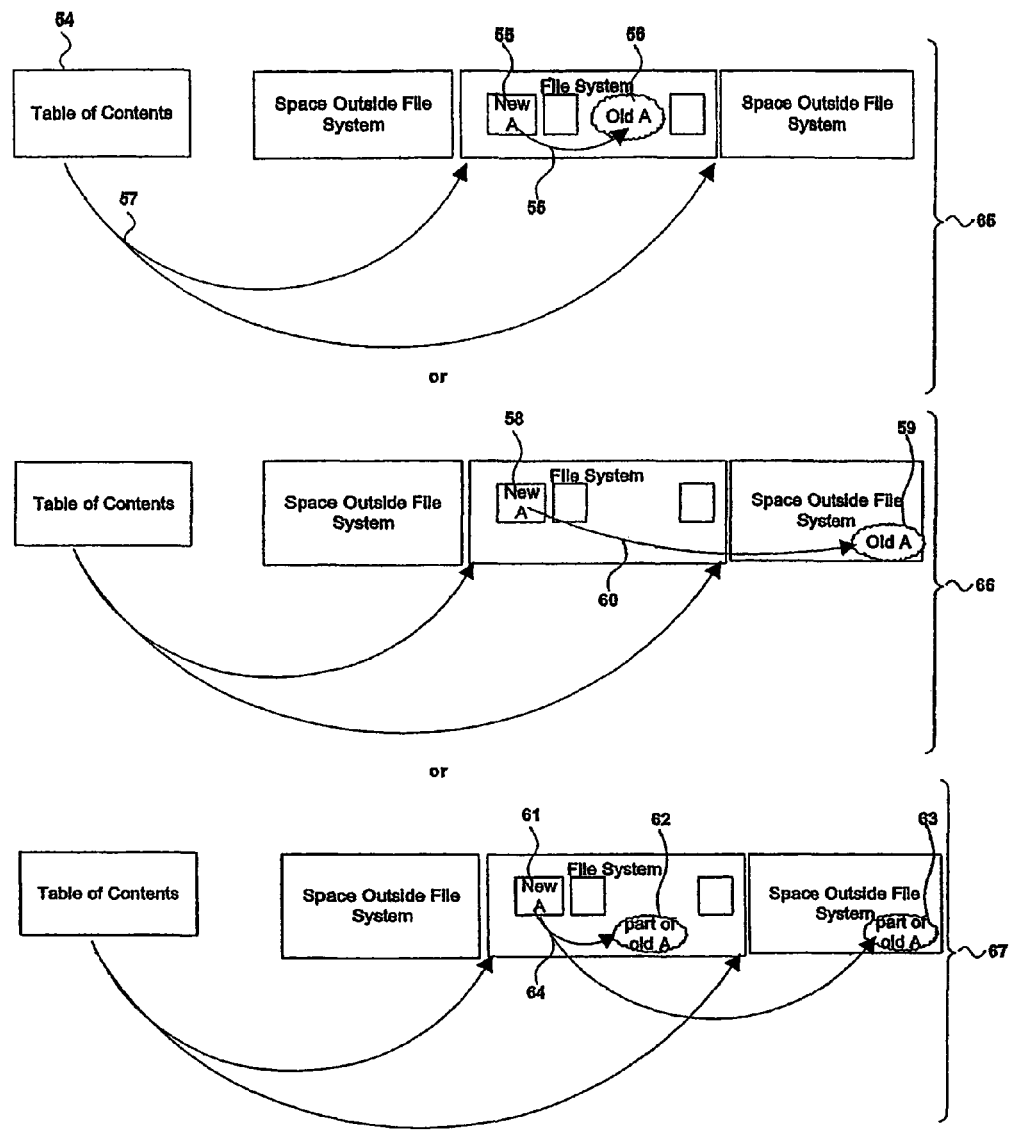
FIG. 9 is a block diagram illustrating three related methods for translocating content in a secure fashion, in accordance with the present invention.

The concept of translocation as implemented in this invention and as illustrated in FIG. 9 is described with reference to examples 65, 66 and 67. Assuming that the apparent target is a hacker's tool such as "ProcDump.exe" and the translocation replacement is a stub executable whose sole instruction is to exit, any attempts to execute this hacker's tool, such as by double-clicking on it with a mouse, would result in the execution instead of the stub, which would immediately exit, such that the execution of ProcDump would appear to have failed to an outside observer with no apparent reason why. The actual mechanisms by which this process operates are as follows. The protected content is copied from its former location 55 to a new location 56; it may be optionally encrypted during the copy process if desired. In the present example this location is actually a series of noncontiguous smaller locations that the content is subdivided into, between files of the file system in the space created when file system blocks are fragmented due to partial usage. These blocks, when used, are marked in the file system's records so they will not be inadvertently overwritten or re-used, but they do not have a corresponding entry in the directory system so they are not accessible from the standard file system interfaces. The former location 55 is populated with a file whose attributes are identical with the protected content in terms of name, size, external appearance, but whose behavior or contents differ as desired (in the above example, ProcDump is replaced with a stub that exits). Attempts to execute "ProcDump" are made but they access the former known location 55. The translocation system can at any time retrieve the actual contents from the new location 56 and either repopulate them into the former location 55 or provide them as needed to the other components of the present invention.

Similarly in examples 66 and 67, the locations that are populated with the translocated content (in this case the real "ProcDump.exe" we're hiding) are either outside the file system entirely 66, or, in the case of example 67, partly within the fragmented between-file space and partly outside the file system.

Note that in an alternate inverse embodiment of this invention, the original file is not moved at all 55 but rather the translocation replacement file is placed into the new location 56, and the file system's pointers 57 are temporarily updated to point to the translocated replacement file. Note that locations outside the bounds of the file system, for example location 59, may be on the same media as the file system or on entirely different media, for example, random access memory, rewriteable storage, network storage, or any other viable storage medium accessible to the system.

An example process used to create a translocation replacement file is now detailed with reference to FIG. 10. For continuity the example above is referred to, where the original file is "ProcDump.exe" and the translocation replacement is "stub.exe" which does nothing other than exit (of course any file of any type may be replaced by any other file of the same or different type, as desired) 75. The ProcDump file is first scanned and its attributes recorded; any icons or other resources are copied and duplicated 68. The ProcDump file is copied at step 69 to various predetermined storage locations, for example locations 56, 69, 62, and 63 of FIG. 9. Optionally to ensure added security, the original contents of ProcDump are zero-filled 70 and deleted in entirety 71 from the media, while bypassing the file system so that the directory entry and pointers remain intact. The original location is used as the location and bounds for the translocation container 72, and this container is then populated with the icons 73 and other attributes 74 of the original "ProcDump.exe", and the container is then populated with the logic and contents of "stub.exe". Thus any attempt by an unauthorized individual to execute "ProcDump.exe" results instead in the execution of "stub.exe", and this persists even if the file known as "ProcDump.exe" is copied elsewhere, since the content has been replaced at a physical level.

Figure 11:
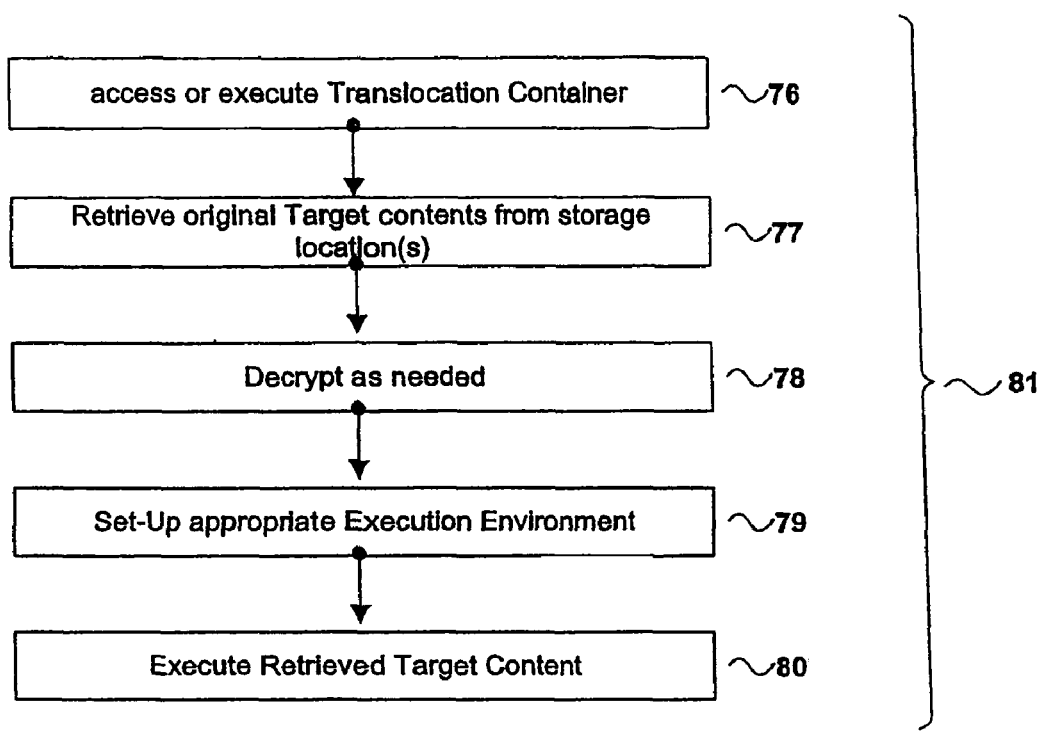
FIG. 11 is a flow diagram illustrating a method to invoke and utilize translocated content, in accordance with the present invention.

With reference to FIG. 11, in certain embodiments, there may arise circumstances where an authorized entity has a valid need to access content which had previously been translocated as above. Operating system interfaces for file access can in this case be monitored, and attempts by an authorized entity to access the translocation container 76 result in retrieval of the original target 77 from storage locations. If encrypted as part of the storage process, decryption is performed on the content 78. An execution environment appropriate to the content type 79 is invoked on behalf of the requesting entity (for example, if the protected content were "readme.txt", a text file, the application "notepad.exe" might be launched). The retrieved content "readme.txt" is then provided to the execution environment 80, and the requesting entity's needs are met ubiquitously.

As explained above, translocation is defined as the ability to provide ubiquitous redirection, which may be used for both the hiding of information, and for the purpose of defending against attacks by disabling the opponent's access to the necessary reverse engineering tools. Translocation may be embodied in a system that actually moves content, or in a system that redirects access to content without moving it. For example, in the case of moving content, an individual's intent on reverse engineering a protected system may wish to run the Visual C++ development tools to attempt to debug the running system. When the protective system is invoked, among the first things it does is translocate all threatening tools it finds, such that Visual C++ is moved from its old location 55 to a new location 56 (see FIG. 9), and the contents of location 55 are replaced with an executable that does nothing but exit when run. Thus when an attempt is made to run the executable file for Visual C++, the file that is actually run is this stub executable that does nothing useful.

Figure 23:
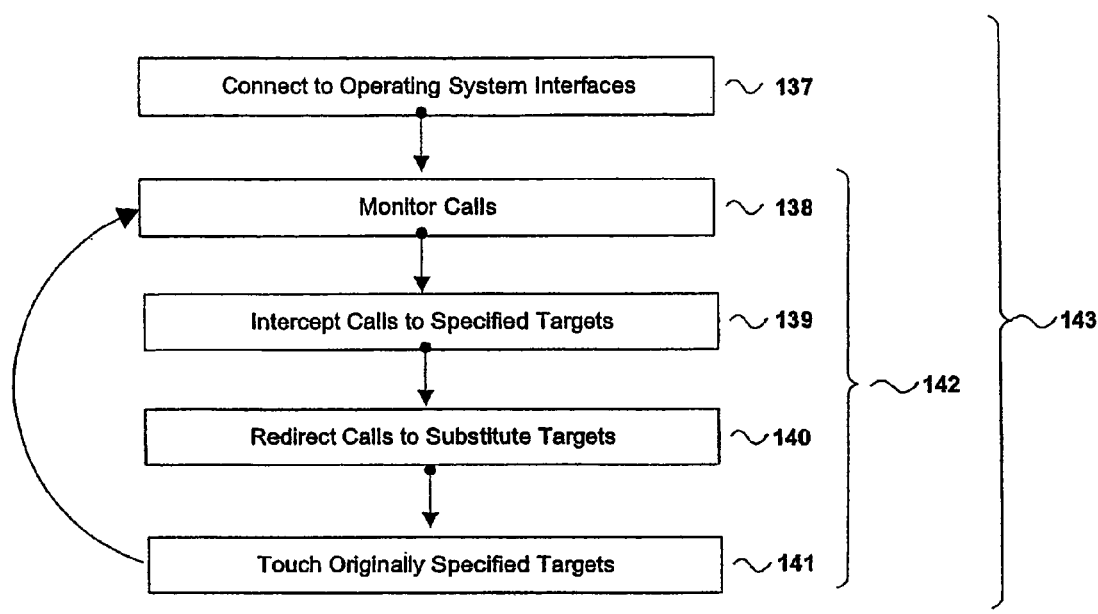
FIG. 23 is a flow diagram describing a mechanism used to prevent the execution of, or access to, content that is disallowed, or to redirect access to other content in a fashion transparent to the accessing party or process, in accordance with the present invention.

An example of translocation that redirects without moving content is similar. With reference to FIG. 23, such a mechanism employs a connection to the operating system interfaces 137 for, in this case, file access, and when an attempt is made to run Visual C++ at location 55 (see FIG. 9), the call is monitored and intercepted at steps 138, 139, and the executable file that is actually run 140 is the replacement stub file 56.

This replacement stub file can do far more than just exit; an example is an embodiment of this invention in which the replacement file is a crippled version of the desired target file 55. In order to further obscure what is happening, care is taken in this example that when the replacement or redirected file is invoked (for example FIG. 11) to touch 141 the desired file 55 so that any file system monitoring tools that may be running will see the expected access 55. Note that as in examples 66 and 67 of FIG. 9 there are embodiments of this invention in which the redirected or moved content resides wholly or partly outside the file system 59, 62, 63, and embodiments in which the redirected or moved file does not reside in contiguous locations but rather in two or more subdivided locations 62, 63. In one such embodiment, the translocated content is stored in the fashion that an M-bit watermark 12 is stored 31, across multiple M-bit locations with no regard for contiguity, and later accessed by means of the methods described above in association with FIG. 7.

Figure 10:
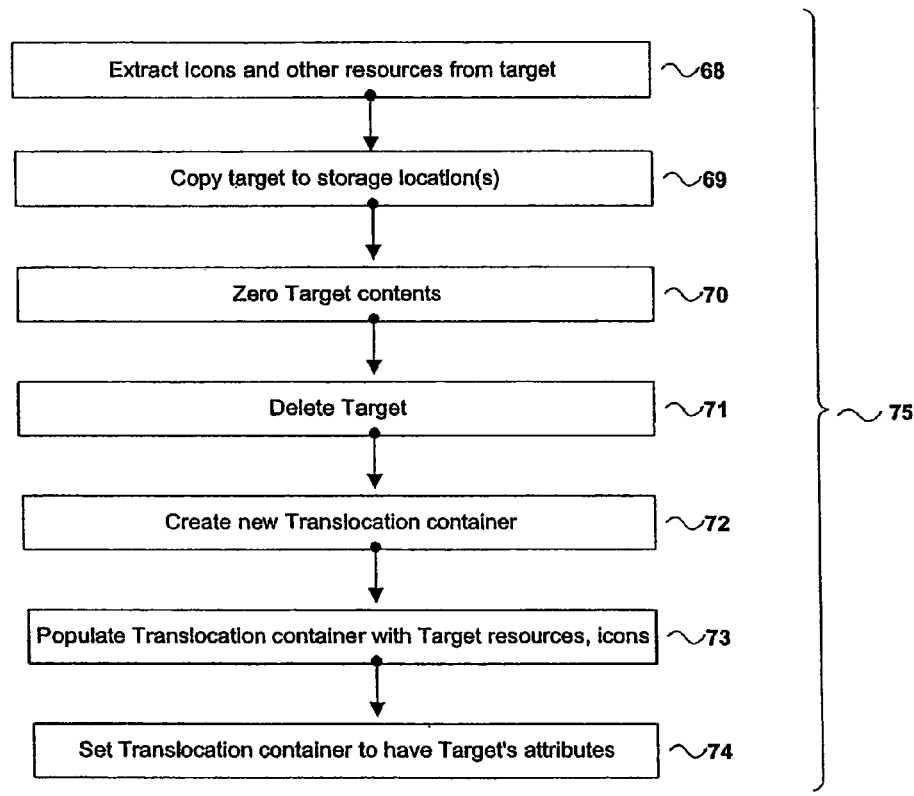
FIG. 10 is a flow diagram that illustrates a method to prepare content for translocation, in accordance with the present invention.

Note that translocated content leaves no obvious clues; the process used to create 73 these substitute or redirected files as in the example FIG. 10 insure that the replacements have all the proper attributes, through steps 68 and 74, including all icons, size and date attributes, and all other properties of the original. Also note that the above example was related to an executable program file, but there are other embodiments of this invention. In one such embodiment, the content is audio, and when invoked in the process of FIG. 11, the act of execution causes the concurrent invocation 76 of an appropriate audio player/helper application 79. In another embodiment of this invention, the content type is a digital video stream, a popular movie title. In this case, the execution environment 79, when invoked 76, is a digital video player helper application. All digital content types are therefore supported by this aspect of the invention.

Another embodiment of this invention as exemplified in FIGS. 12, 13, 14, 15, and 16. This embodiment relates to a set of mechanisms that operate to tokenize and obfuscate (see step 83 of FIG. 12, reference 88 of FIG. 13 and step 92 of FIG. 14) content of all types (see step 98 of FIG. 16, below) in order to eliminate trivial observational analysis, and in the case of executable content, to greatly increase the difficulty of unauthorized debugging. This embodiment also serves to prohibit the modification of all types of content, since the tokenized obfuscated content 89 cannot be modified using standard editing/modification methods due to its proprietary tokenized formatting. In the case of executable content, disassembly is also prohibited by this process since the resultant output 84, 89 is no longer standard assembly language.

Figure 12:
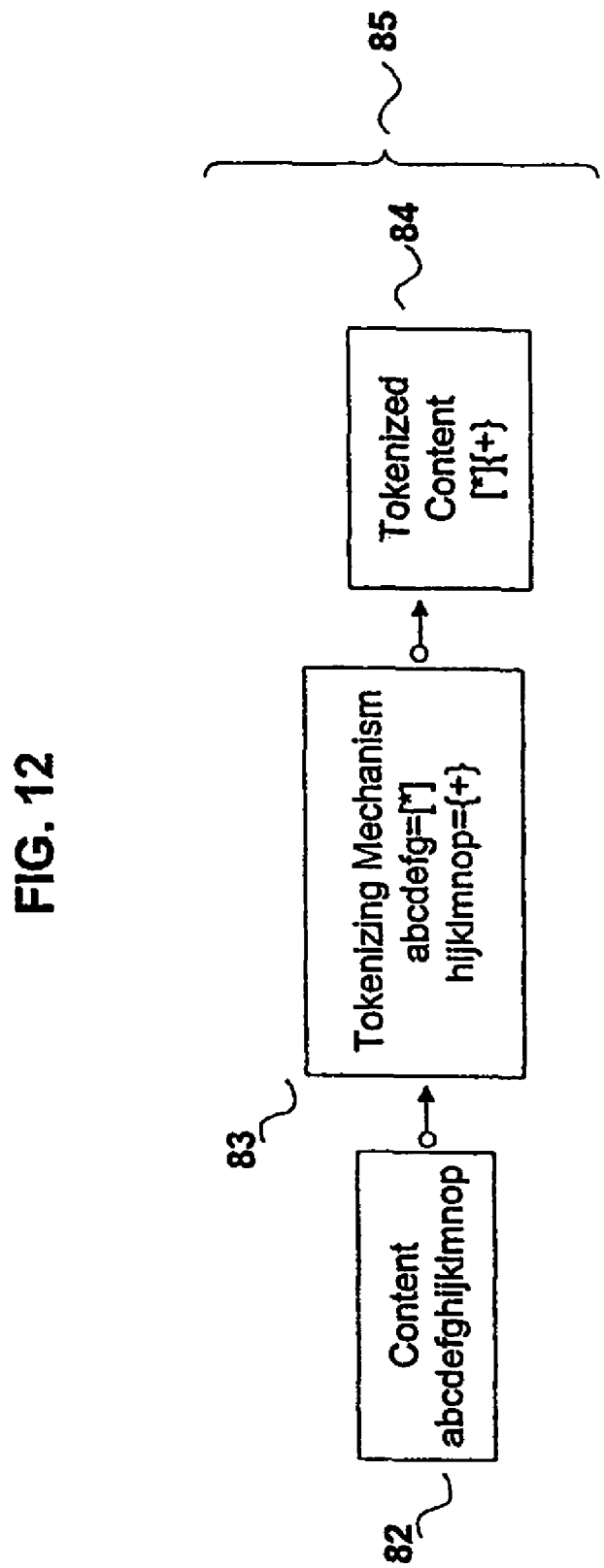
FIG. 12 is a flow diagram illustrating a method to tokenize and obfuscate content, in accordance with the present invention.
Figure 13:
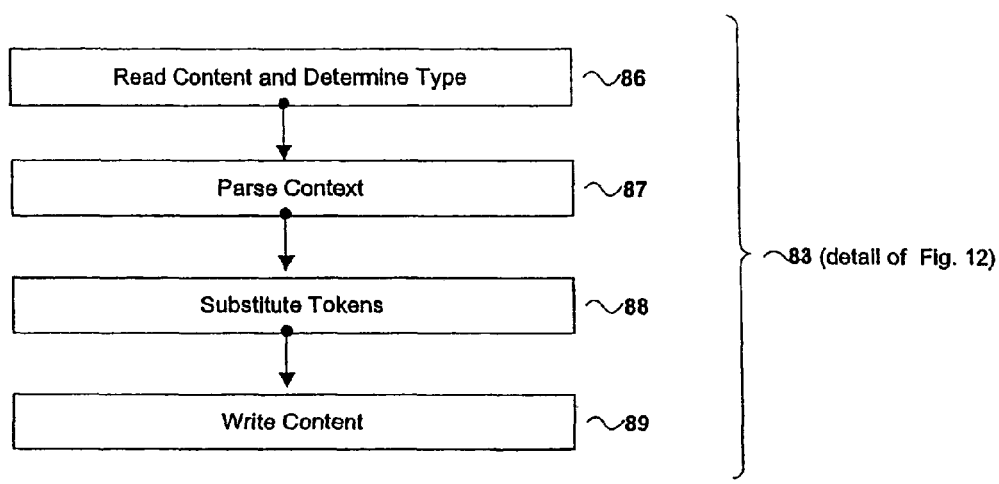
FIG. 13 is a detailed flow diagram illustrating a method to tokenize and obfuscate content, in accordance with the present invention.
Figure 15:
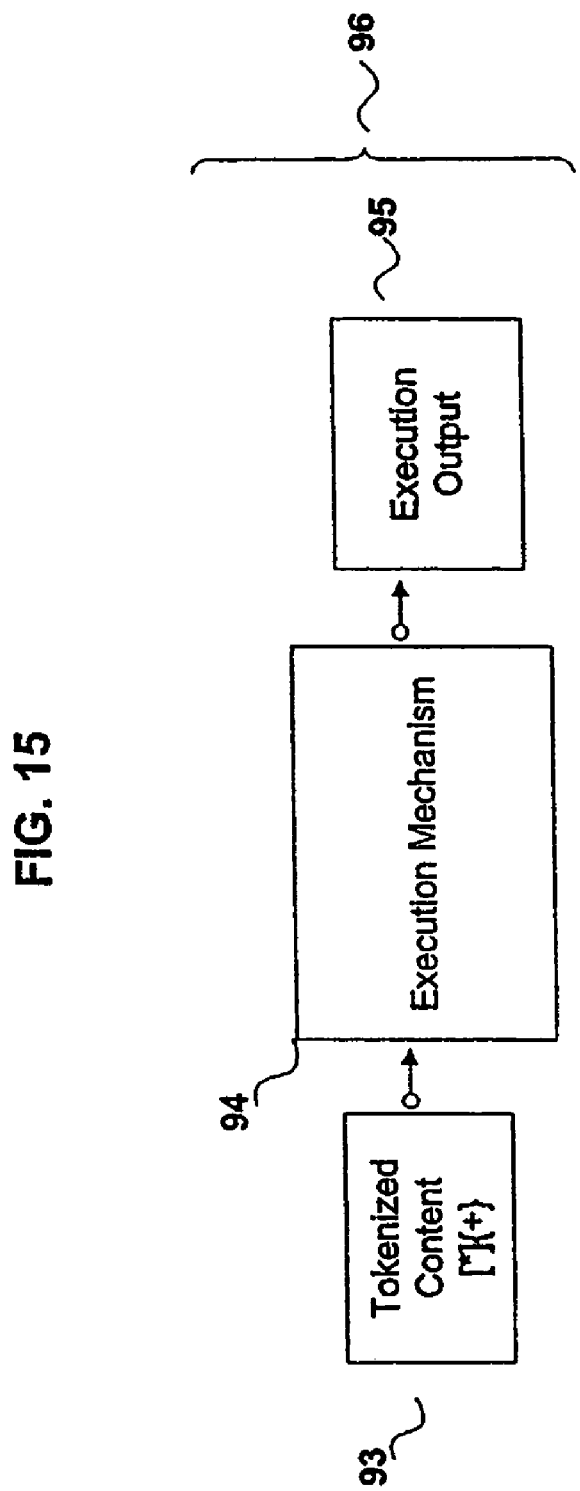
FIG. 15 is a high level flow diagram illustrating a method to utilize previously tokenized and obfuscated content, in accordance with the present invention.

For example, with reference to FIG. 12, digital content 82 may be tokenized according to any of a number of standard tokenization mechanisms 83, and the resulting tokenized content 84 is stored (see FIG. 13, step 89). With reference to FIG. 15, the stored tokenized content 93 can be later be retrieved and subsequently reconstituted and executed 94, provided an execution output 95 that is the same as that which is originally intended.

With reference to FIG. 13, the stream of digital content to be tokenized and obfuscated 82 (see FIG. 12) is presented. The digital content is read and its type is determined 86. The system and method of the present invention preferably recognizes all existent digital content/file/stream types; in the case of this example the file type is determined to be an executable or Windows "PE" file conformant with the specifications found in "Peering Inside the PE: A Tour of the Win32 Portable Executable File Format", Matt Pietrek, March 1994. The content is parsed 87, with a lexical parser similar to those found in many compiler front-end mechanisms. Portions of the content are replaced with tokens 88 that bear an appropriate lexical relationship 91, understood to the mechanisms of this invention, to the content and the context. In one example the token replacement may be fixed; for example the assembly language MUL or multiply operator is replaced with the token ˆ. To further complicate this example, the token replacement may be variable, for example based on location, such that the MUL operator's token is ˆ if it occurs in the first 50 lines of assembly code, otherwise it is #.

Figure 14:
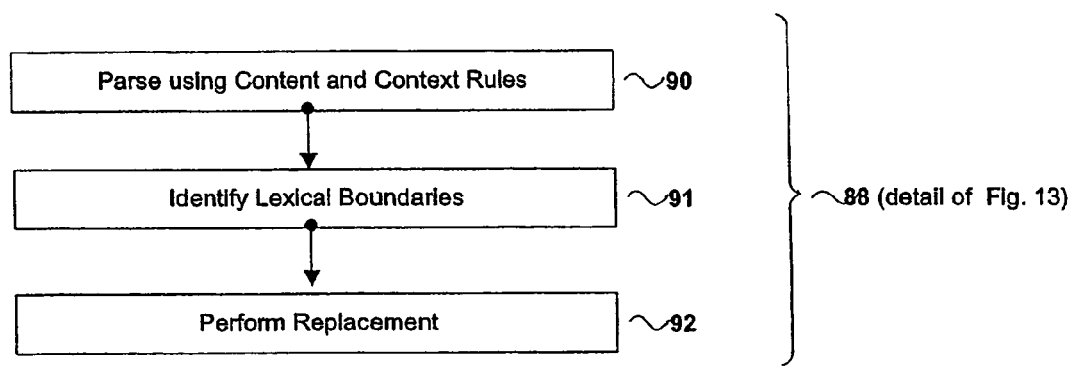
FIG. 14 is a further detailed flow diagram illustrating a method to tokenize and obfuscate content, in accordance with the present invention.

Details related to the substitution of tokens are provided at FIG. 14. The content is parsed at step 90, as described above in FIG. 13, step 87. Lexical boundaries of the parsed content are identified 91, and the replacement is performed. In other words, using the English language as an example, if one were tokenizing the sentence "My dog does not understand my dogma." it might be appropriate to replace the term "dog" with the token "*", but it would be wrong if we also made the same replacement within the word "dogma" and turned it into "*ma" because the context and lexical meaning of "dog" and "dogma" are different despite the fact that the first three characters are identical. A context free search would find them to be the same; "dog" matches "dog" and matches the first three characters of "dogma" but since the meaning is different, the system must be intelligent enough to do more than match the appearance of an item; the item's meaning and contextual relationship must be understood. Thus it is not a simple context free blind replacement such as doing a global replace edit using Microsoft Word; the location and meaning of each item, and its relationship to items before and after it are all relevant to the substitution logic used to tokenize it.

Returning to FIG. 13, the tokenized content is written out 89, and may then be interleaved, multiplexed, encrypted, and/or hidden as illustrated in the previous examples described above.

Figure 16:
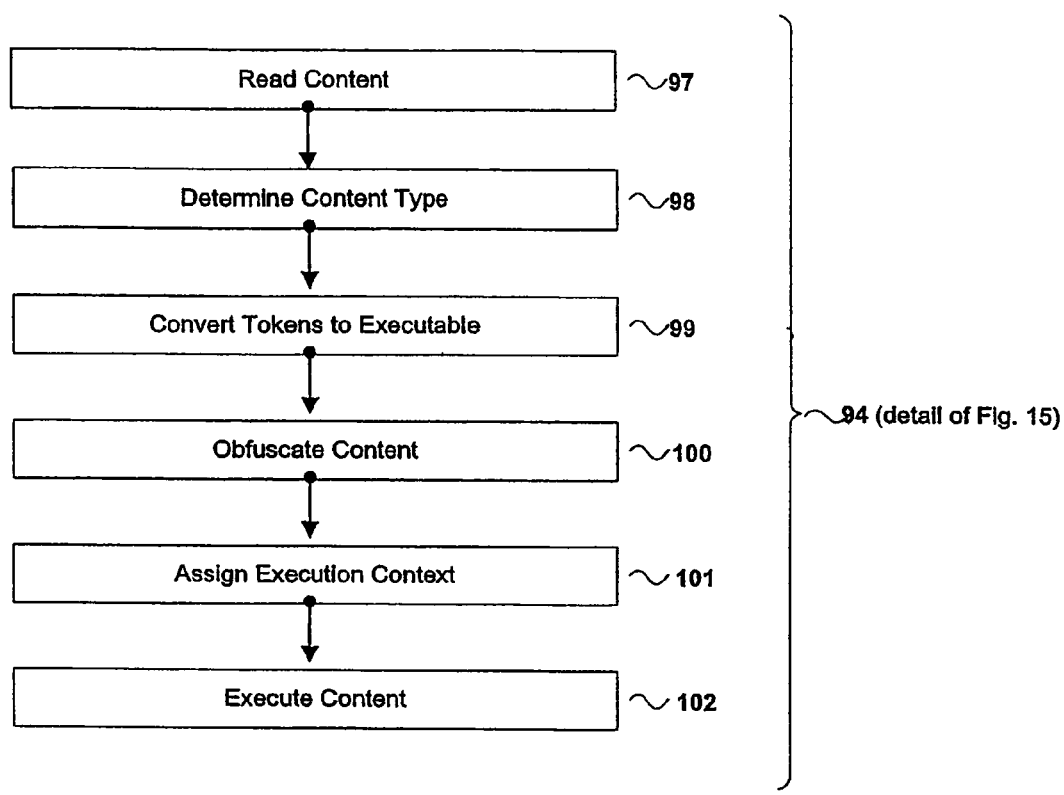
FIG. 16 is a detailed flow diagram illustrating a method to utilize previously tokenized and obfuscated content, in accordance with the present invention.

With reference to FIGS. 15 and 16, at a later time, as needed, when it is time to execute this content, the tokenized content 93 is located and extracted at step 97 (if it was indeed interleaved, multiplexed, encrypted, and/or hidden as described above). The content type is determined at step 98, and the tokens are parsed and converted back into standard executable code 99. The content may then be re-obfuscated 100 by applying known variations on standard assembly language which serve to confuse debugging and disassembly tools. It may then be executed in an appropriate execution context 101; in the case of executable "PE" program code, that context is the operating system itself to be executed 102 upon the processor 5 (see FIG. 1).

In the example below, this invention replaces standard assembly language elements with permuted assembly language which has attributes that cause disassembly utilities such as, for example, the popular disassembly tool IDA Pro, sold and distributed by the Belgian firm DataRescue. Such tools depend on assembly language being formed and structured in specific standard ways; the enhanced assembly language generated by this invention offers the same logical function as the code it replaces but is resistant to disassembly as shown in the example code illustrations below.

The first such code example below illustrates this invention's insertion of jmp statements to instances of the following assembly language instructions: inc, dec, call, jmp, and push Convert this: 0000: 90 nop 0001: FF inc
To this: 0000: EB FF jmp 0001 0002: inc For example, this embodiment changes instances of "jumps" to (push and return) calls:
Convert this: stmt: JUMP2V(addrjmp) "\tjmp\t %0\n" 3
To this: stmt: JUMPV(addrjmp) "\tpushl\t$%0\n\tret\n" 3

For example, jumping into the middle of an instruction to confuse all disassemblers:
erp: mov ax,0FE05h
   jmp $-2h
   add ah,03Bh Another code example of the same class of techniques used by this invention:
B8 05 FE EB FC 80 C4 3B mov ax,0FE05h ;ax=FE05h
B8 05 FE EB FC 80 C4 3B jmp $-2 ;jmp into '05 FE'
B8 05 FE EB FC 80 C4 3B add ax,0EBFEh ;05 is 'add ax'
B8 05 FE EB FC 80 C4 3B cld ;a dummy instruction
B8 05 FE EB FC 80 C4 3B add ah,3Bh ;ax=2503h Note that the "add ah,03Bh" command is instantiated to insert the value 2503h into location ax. By adding five bytes (as opposed to simply using 'mov ax,2503h') this code will defeat all known disassemblers. Even if the instructions are disassembled properly, the value of ax will not be known, so every int call after this point will not be commented properly, as long as the system never moves a value into ax. This embodiment of the invention can conceal the value from the disassembler by using 'add ax' or 'sub ax' whenever possible. Thus any value can be put into ax.

This invention, of course, must make such substitutions in an automated fashion; the code example below illustrates such programmatic assembly language substitution:

```
/* Output the anti-disassembly code */
/* Based on the following code
print("mov ax,0FF05h\n");
print("jmp short $-2h\n");
print("mov ax,0FFFFh\n");
print("jmp short $-07eh\n");
*/
{
    unsigned char randomBytes[10];
    int i;
    char buf[100];
    for (i=0;i<4;i++) {
        randomBytes[i] = rand( ) % 256;
    }
    sprintf(buf, "\t.byte 0x66, 0xb8, 0x05, 0x%.2x\n", randomBytes[0]); /* mov */
    print(buf);
    sprintf(buf, "\t.byte 0xeb, 0xfc\n");      /* jmp */
    print(buf);
    sprintf(buf, "\t.byte 0x66, 0xb8, 0x%.2x, 0x%.2x\n", randomBytes[1], randomBytes[2]);  /* mov */
    print(buf);
    sprintf(buf, "\t.byte 0xeb, 0x%.2x\n", randomBytes[3]);        /* jmp */
    print(buf);
}
emitcode( );
```

In an alternative embodiment of the above aspect of the invention, and a variant example, the inventive system and method, after having tokenized and obfuscated the content and optionally interleaved, multiplexed, encrypted, and/or hidden it, later, as needed, when it is time to execute this content, the content is located and extracted (if it was indeed interleaved, multiplexed, encrypted, and/or hidden), parsed, content type determined, the tokens are parsed and execution occurs in lockstep with the conversion to executable content so the reconstituted content is never written to a file or provided to any entity in the system, but is rather executed on the fly within a custom execution context 101 (see FIG. 16) or custom interpreter 101. Note that "content" may be any digital content; executable program code, audio, video, digital documents, and the "execution content" is constructed to execute the content. The meaning of "execute" varies depending on the content; for example audio or video would be executed on an appropriate audio or video player, documents presented in an appropriate viewer, application programs and games run.

An embodiment of this invention may generate for example instances of the variant assembly language as illustrated in the example above, and thereby be resistant to disassembly, and may also be made more difficult to debug by defeating automatic disassembly tools using obfuscated assembly language programming techniques, for example inappropriate not-used jumps into the middle of instructions. Such obfuscation, or similarly effective methods accomplished by other means, enhance the security of the invention. Note that this is in addition to the inherent security of running within an interpretive environment. The interpreter operates as a shield from debugging and reverse-engineering tools. The interpreter serves as a layer of abstraction between the protective invention and the real operating system. The values found in system memory and registers will not be directly related to the logical flow of the interpreted program; they will show the debug state of the interpreter itself instead, and that will make assembly language debugging very difficult.

Figure 17:
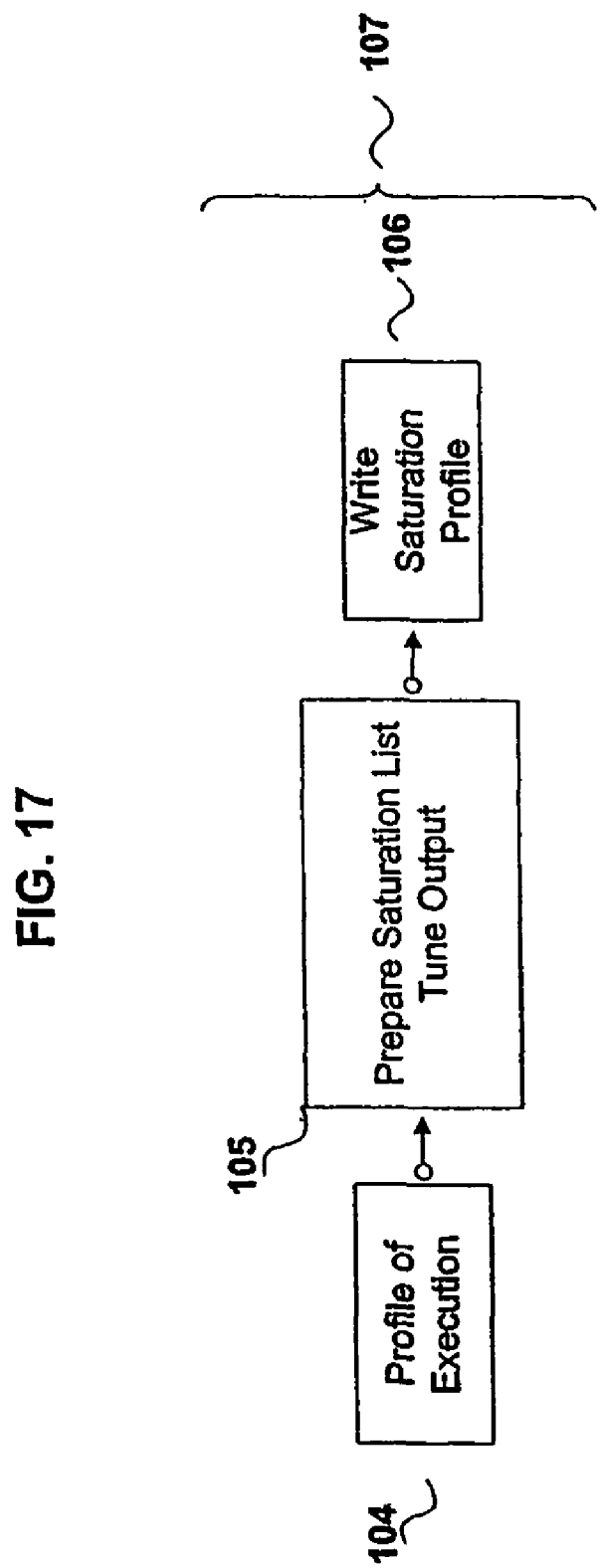
FIG. 17 is a flow diagram illustrating a method to saturate logging and debugging tools and techniques as a method of providing additional security, in accordance with the present invention.

In another embodiment of this invention described with reference to FIG. 17 and FIG. 18, a protective system for digital content, or any running software application or system of any kind on any platform, is itself protected from being debugged, monitored, logged and understood by an invention mechanism which creates carefully targeted and tuned system activity, or "saturation" activity. This activity causes an instrumented or debug-enabled computer system to generate large volumes of debug, log, and/or monitor-tool traffic unrelated to the protective logic. For example such traffic can make a log that would have been 15 kilobytes grow to be 150 megabytes. Monitoring/logging/data watching debug techniques are easily overwhelmed by this approach. One example of such a logging monitoring tool and its usage is Filemon, an excellent freeware tool which logs system file activity. When exposed to the saturation traffic 110, the Filemon event log can grow to be orders of magnitude larger than it would otherwise be. Events of interest to one debugging or reverse engineering the system are therefore lost in the process.

This targeted saturation embodiment of the present invention operates as follows. The protection by saturation of a system or application first depends on understanding the nature of the normal system traffic generated by that application. Therefore, with reference to FIG. 17, the protected entity must first be analyzed as in step 107. The protected entity is executed on a system that is running the saturation profiler tool 104. This tool profiles activity 104 in such ways that classes of activity are monitored (for example SCSI calls or registry calls or file opening) and statistics are gathered (for example, scsi calls logged during the execution of program material to be protected). For example, 400 file opens, 3500 reads of 2048 bytes each, 120 query commands. All aspects of system utilization are monitored and logged and categorized by type and frequency. This forms a profile of activity for the program material. This profile is encoded in a fashion readable by a later process of this invention (FIG. 18, described later in this document), and written to a "saturation list", along with a tuning profile 105 with detailed encoded instructions 106. These instructions specify the desired traffic types and volumes, for example to mask the SCSI traffic, in one embodiment, the present invention is directed to generate 4000 file opens in similar drive locations and sizes, 30,000 reads, 500 query commands.

Figure 18:
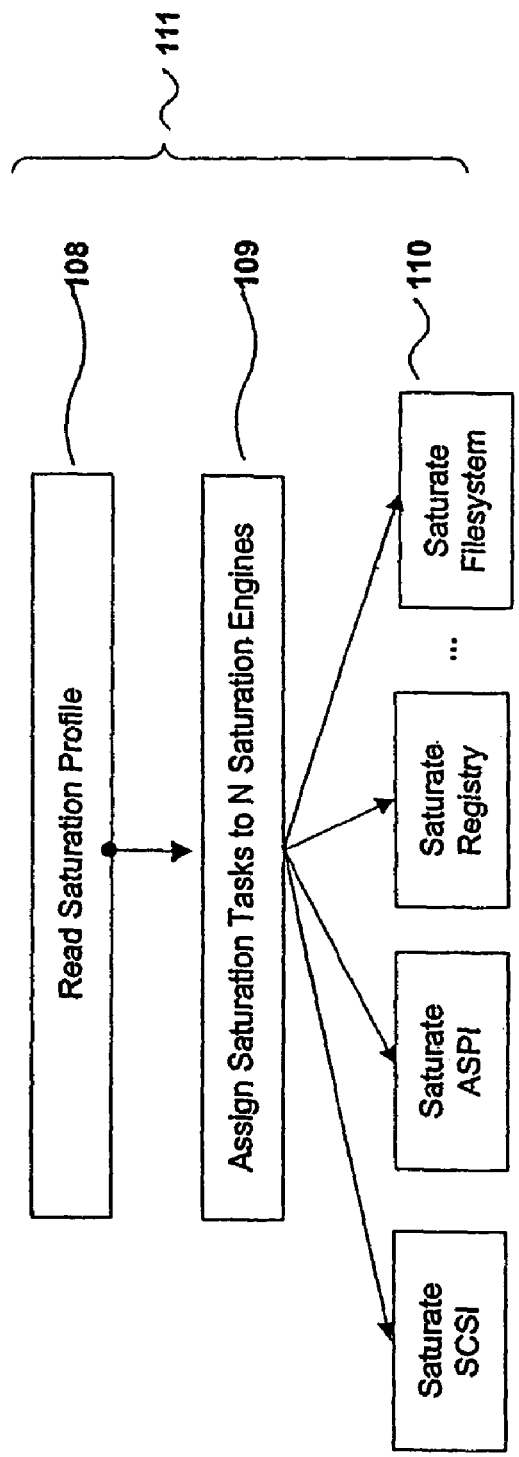
FIG. 18 is a detailed flow diagram describing a method to saturate logging and debugging tools and techniques as a method of providing additional security, in accordance with the present invention.

As described in FIG. 18, the invention which actually generates the directed saturation traffic may first open the saturation profile 108, decode the instructions as required, determine which types of traffic are desired (for example network traffic, or as in the example above SCSI traffic), communicate with the appropriate saturation engine (as above, the scsi saturation engine would be used in this example; each such entity may be used individually or in combination, such as for example doing both SCSI and network saturation) 109. The saturation engine then executes the required commands 110 and FIG. 19, (see below for details) and generates the appropriate levels of traffic.

Figure 19:
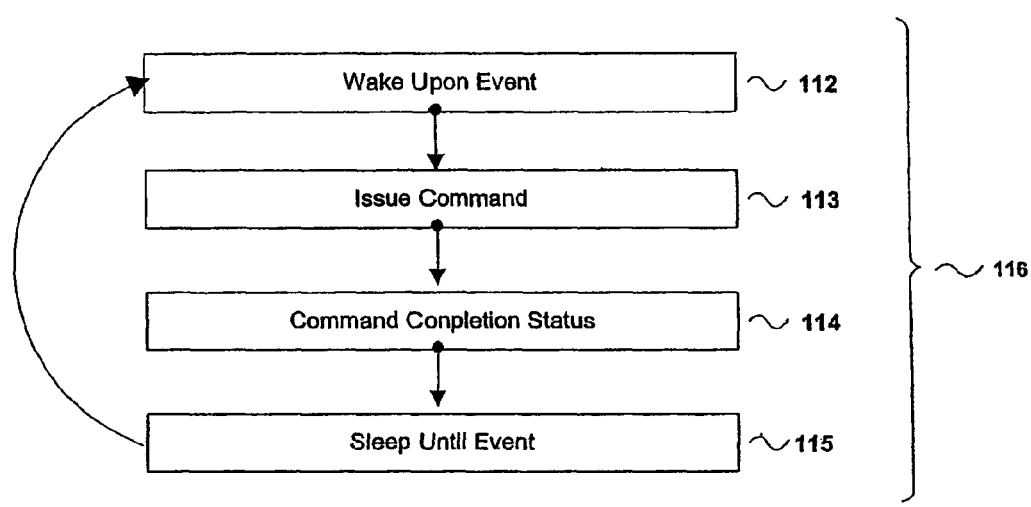
FIG. 19 is a further detailed flow diagram describing a method to saturate logging and debugging tools and techniques as a method of providing additional security, in accordance with the present invention.

The functioning of an individual instance of a saturation engine 116 is shown in FIG. 19. The SCSI example from above provides an illustration to one skilled in the art; the SCSI interfaces are utilized and an event driven mechanism is created, where the first logical step is to wait on the event of either a command completion or a new external request to issue a command 112. Upon awakening, if a command is pending (a SCSI file open, for example, as the next saturation command in the desired saturation list), it is executed 113, and synchronously waited upon if desired 114 with varying next-step results optionally depending on completion status. If normal completion, the process executes a hard sleep for a predefined interval if desired (to throttle back activity) 115, and then sleeps again waiting on the events as in 112. This is indeed a loop and would be infinite if the queue of commands were infinite, however being event driven, the loop suspends execution after the last command is consumed and is optionally swapped out, eliminating system resource utilization until again needed. The throttle-back sleep allows the saturation system to selectively control its utilization of system resources dynamically, for example to avoid monopolizing system resources when they're needed for more important activities. The ability to be throttled back is controlled by the process of the invention as needed to reduce saturation traffic in specific ways at specific times, and may be overridden programmatically by other invention embodiments within the protective system if they determine they need more resources for any reason.

Figure 20:
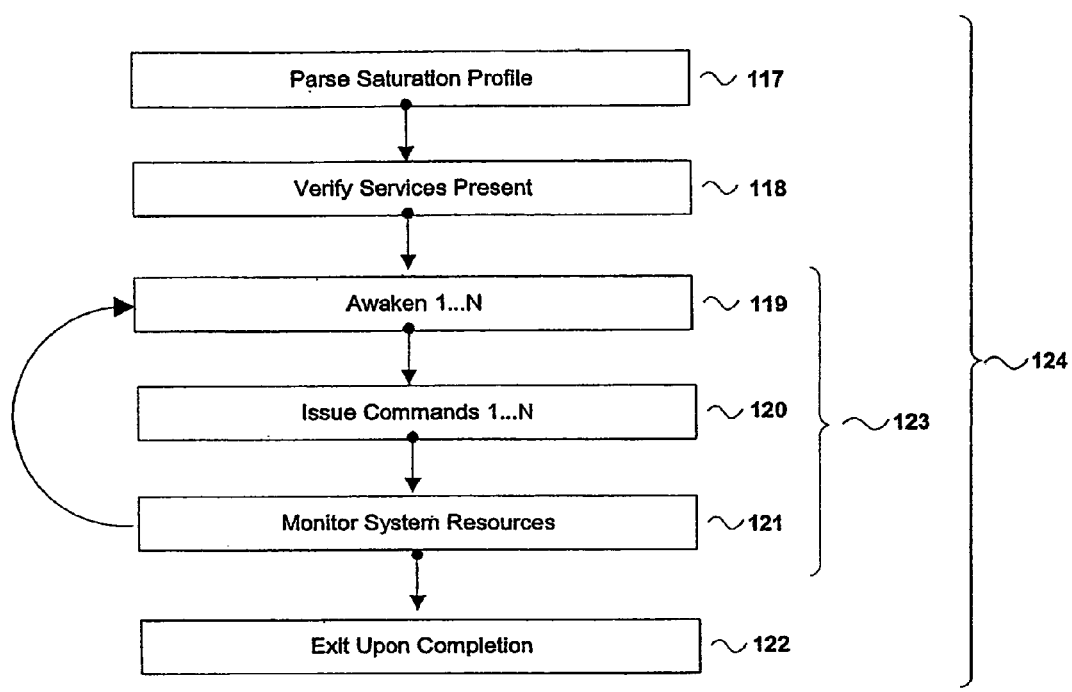
FIG. 20 is a detailed control flow diagram describing a method to saturate logging and debugging tools and techniques as a method of providing additional security, in accordance with the present invention.

All individual saturation engines are controlled by a saturation scheduler as shown in FIG. 20. The scheduler opens, decodes, and reads (parses) 117 the saturation profile and system settings directions from the saturation list previously described. The necessary saturation engines are polled, 118 launched if not already present, and the engine specific commands (for example SCSI commands as above) are queued to the saturation engine's 123 main scheduling loop. The underlying process driving the command queue mechanism is event driven and clock driven, with saturation engine tasks being fed commands at predetermined rates. The command feeder process is itself event driven, sleeping and waiting 119 upon the event of commands entering the queue, issuing the command 120 with dynamically controllable command frequency and adding additional sleep time commands to the payload so the saturation engine knows how much additional sleep over and above the event queue events is required (this is the throttling mechanism as described in the paragraphs above), and monitoring the effect on the system to determine if the throttling amount and the command queue depth and speed are appropriate to the task. This main scheduling loop 123 would be infinite if not event driven, however since it is event driven (as the individual saturation engine loops are) when the queue of commands is empty, the system is quiescent, suspended, and optionally swapped out. Upon overall completion, the scheduler exits 123 and may optionally kill all the individual saturation engines previously spawned.

Figure 21:
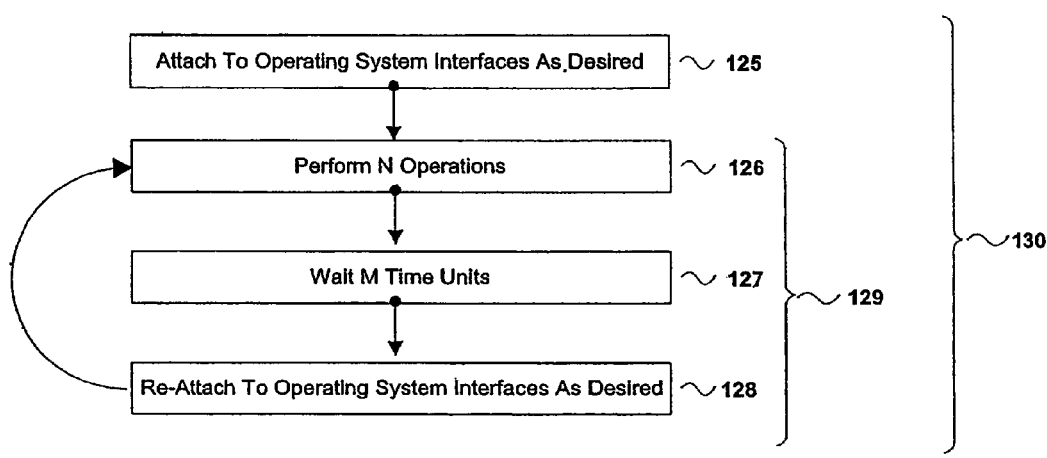
FIG. 21 is a flow diagram describing the aspects of this invention that allow for the secure attachment (hooking) of device shims, operating system shims, and device driver shims, in accordance with the present invention.

In another embodiment of this invention as shown in FIG. 21, a filter, shim, device driver extension, or substitute device driver is inserted into system interfaces, interposing itself 125 between the original driver or interface and all other entities by stealing inputs directed towards those interfaces, reattaching any previously attached entities to the public "subsumed interfaces", optionally passing through or modifying the traffic to those interfaces, optionally logging traffic, thus subsuming the "public face" of such interfaces. An example would be to take over the interface to the system "beep" function. Every time a system "beep" (the annoying noise the PC speaker can make at power up on many Personal Computer systems) is requested, the shim steals the command. In this example, if the requesting process is your email program, the beep is passed through, and the system beeps. If the requesting entity is a disallowed entity, like an equally annoying pop-up browser window, the beep may be thrown away and thereby suppressed. Note the vulnerability of such an interface shimming techniques in its simplest form is that another such "imposter" shim intended to compromise such a "protection" shim could be inserted after (or before, or both before AND after it, to allow it to be bypassed entirely at will, depending on the intent) the protection shim, thus obviating the utility of such a mechanism. In other words, the shim itself can be monitored or subverted if it in turn is shimmed. Therefore this invention compensates for that vulnerability by continually reconnecting. The process as shown in FIG. 21 initiates by first finding the system interfaces it intends to subsume and uses the lowest possible level of interface; interface use is performed based on that low level information rather than using higher level abstractions made available by the operating system. The interface's external interface functions are subsumed by the shim 125, any commands received while impersonating the interface are optionally either passed through, modified or discarded (the system may desire to do any of those things, for example if authorizing by PID, a read access might be thrown away of the requesting PID were believed to be a security threat like a debugger) 126. Alternatively, the system could transparently pass all requests through 126 and optionally offer an undocumented other interface so a knowing programmer could access system functions through the shim directly 126, bypassing system interfaces and associated interface monitoring tools. For example as part of a broad throttling process, the process may optionally sleep between subsumed-interface-commands 127 thereby retarding public interface access, thus providing reduced system resource usage as desired to specific entities on the system as needed (for example to starve a reverse engineering tool and reduce its utility). Once a number of such commands have been processed and time intervals optionally slept by the process, it detaches from the operating system interfaces and immediately reattaches 128 again at the lowest level; this to ensure that it has not been compromised by another shim inserting itself before or after it. This reattachment loop 129 may be infinite, the shim may be left in place indefinitely to exit upon system shutdown, and optionally not reconnect at next reboot, effectively thereafter disappearing from the system.

In the code example below, this dynamic-reconnection mechanism of the present invention manifests itself as a process that attaches to the first location directly at the interface level, and forces all subsequent shims of any other kind to attach themselves after the invention by continually reattaching in the first position:

```
// find the bottom of the bottom of the OS-Interface ShimList; AutoReAttach is placed
//at the top of the ShimList. If an authorized request is received, we use the saved location of the //bottom
of the OS-Interface ShimList to bypass anyone who might be Attached in between
//If an unauthorized request is received it is passed down the ShimList normally.
//The Attach and reAttach logic keeps the __ Attach at the top of the ShimList.
// Install and remove a dummy SystemInterface Attach in order to get
//    the address of the last Attach in the OS-Interface ShimList
s__pPrevAttachDummy = ANYINTERFACEMgr__InstallSystemInterfaceApiAttach(FnAttachDummy);
ANYINTERFACEMgr__RemoveSystemInterfaceApiAttach(FnAttachDummy);
// Keep going until we get to the OS-Interface itself
apAttachs[0] = s__pPrevAttachDummy;
wIdAttach = GetAttachId((BYTE *)*(apAttachs[0]), NULL);
idxShimListDepth = 1;
while (wIdAttach != ANYINTERFACEMGR__VXD__ID)
    {
        // Remove all of the Attachs we have found so far
        for (ii = 0; ii < idxShimListDepth; ii++)
        {
            ANYINTERFACEMgr__RemoveSystemInterfaceApiAttach(*(apAttachs[ii]));
        }
        // Add and remove a dummy Attach to get the pointer to
        //    the next Attach in the ShimList
        s__pPrevAttachDummy =
ANYINTERFACEMgr__InstallSystemInterfaceApiAttach(FnAttachDummy);
        ANYINTERFACEMgr__RemoveSystemInterfaceApiAttach(FnAttachDummy);
        apAttachs[idxShimListDepth] = s__pPrevAttachDummy;
        // Now replace all the Attachs we removed above
        for (ii = idxShimListDepth - 1; ii >= 0; ii--)
        {
            ANYINTERFACEMgr__InstallSystemInterfaceApiAttach(*(apAttachs[ii]));
        }
        // Get the ID of the most recently found Attach
        wIdAttach = GetAttachId((BYTE *)*(apAttachs[idxShimListDepth]), NULL);
        // Increase the depth by one for the next pass
        idxShimListDepth++;
    }
    // Remember the address of the final OS-Interface "Attach"
    s__pAnyInterfaceAttach = s__pPrevAttachDummy;
    // Install our Attach at the end of the ShimList
    if (s__dwSiDct == 0)
    {
        s__pPrevAttach = ANYINTERFACEMgr__InstallSystemInterfaceApiAttach(RchwyAttach);
    }
static void FixAnyInterfaceShimList(
//
//
//
)
{
 // Install and remove a dummy SystemInterface Attach in order to get
 //    the address of the last Attach in the OS-Interface ShimList
    s__pPrevAttachDummy = ANYINTERFACEMgr__InstallSystemInterfaceApiAttach(FnAttachDummy);
    ANYINTERFACEMgr__RemoveSystemInterfaceApiAttach(FnAttachDummy);
    // If we aren't the last Attach in the ShimList, remove our Attach and
    //    then reinstall us to get us back at the end of the ShimList
    if (RchwyAttach != *s__pPrevAttachDummy)
    {
        ANYINTERFACEMgr__RemoveSystemInterfaceApiAttach(RchwyAttach);
        s__pPrevAttach = ANYINTERFACEMgr__InstallSystemInterfaceApiAttach(RchwyAttach);
    }
    return;
} // End FixAnyInterfaceShimList
```

Figure 22:
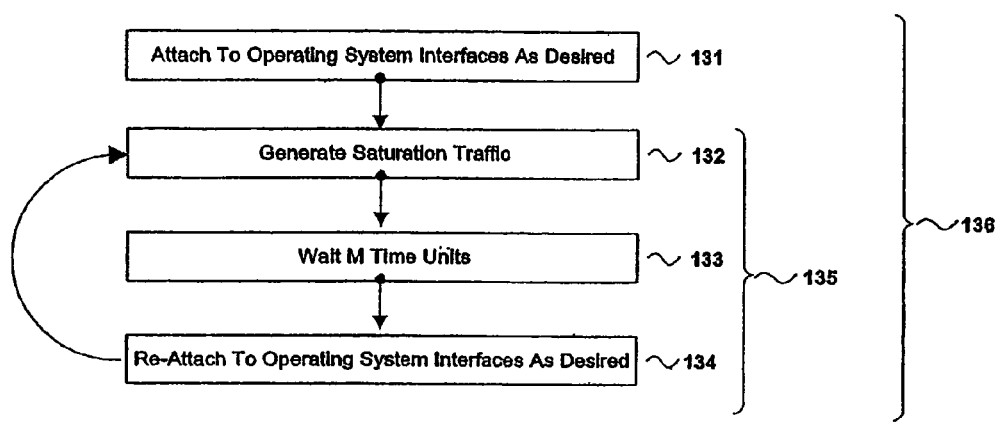
FIG. 22 is a flow diagram describing the aspects of this invention that allow for the security obfuscation of the activity of device shims, operating system shims, and device driver shims.

In another embodiment of this invention, described with reference to FIG. 22, such an attach and re-attach strategy is implemented for the purposes of feeding spurious or saturation traffic into an opponent reverse-engineering tool. In other words, this invention may be used to isolate and defeat certain reverse engineering tools. For example, if the tool FileMon (an excellent reverse engineering tool distributed by SysInternals.com) were in use, it would effectively monitor all usage of the filesystem and record all access in detail. If it were desirable to hide access from such monitoring tools, one such invention use for example would be to isolate FileMon by attaching one shim before it, and one after it, and having each shim continually reattach itself. If each such shim had a data connection to each other bypassing FileMon it would be trivial to shunt all traffic around FileMon, effectively causing it to record nothing. In more subtle usage examples, selected traffic could be hidden from FileMon in this fashion, while spurious saturation traffic was directed through it.

In this embodiment, as above, a filter, shim, device driver extension, or substitute device driver is inserted into system interfaces in this case, interposing itself at step 131 between the reverse engineering monitoring shim and the rest of the system, thus apparently subsuming the role of the operating system interface and providing false and misleading data 132 to the monitoring/reverse-engineering shim/tool. The vulnerability of all such interface shimming techniques in their simplest form is that another such shim intended to compromise such a shim could be inserted after (or before, or both, depending on the intent) this process at any time, thus obviating the utility of such a mechanism. Thus, this embodiment of the invention includes a re-attachment mechanism 134 which guarantees a specific attachment location, in this case directly before the opponent reverse-engineering/monitoring shim, as specified by the invention's user. This is accomplished by repeated automated re-insertions 135 into the interface chain. Such reinsertions are done in a fashion that does not impede function by waiting a number of time units 133 between issued instructions. Thus this embodiment of continual-interface-reattachment can eliminate the threat of device redirection and monitoring tools being used to subvert the system.

In another embodiment of the present invention, as illustrated in FIG. 23, ubiquitous redirection of operating system interface access is employed to prevent the execution of, or access to, content that is disallowed, or to redirect access to other content in a manner that is transparent to the accessing party or process. As above, this embodiment of the invention connects to the appropriate operating system interfaces at step 137, executing the reconnection logic as needed as in FIG. 21 and the description above. Calls to the interface are monitored 138, and when appropriate, intercepted 139. For example, if a tool such as FileMon were discovered on the system at the time of the invocation of this embodiment, it would be logged as an "access to monitor" and when it was accessed 138, it would be noted, and access would be redirected from the FileMon operation to a different executable 140, in this example an executable that does nothing but exit. At the same time this redirected executable was launched 140, the originally intended executable is touched 141, such that any other monitoring tools would show the access. Thus the individual intent on reverse engineering would launch FileMon and it would exit immediately 142. The individual might use other tools and discover that FileMon did indeed launch (file system access to the original file will be logged as though it was launched).

The code example below illustrates the invention discussed above in conjunction with FIG. 23; a means of redirecting access 140, for example, from one executable 138 to another 139 ubiquitously:

```
// If the access is one that the system wishes to disallow
//    and redirect, and a stub exe has been loaded,
//    point it at the stub file instead
if ( ((DWORD)(-1) != s_idxStub)      &&    // stub
                                             loaded
     (!fPidMatch)                    &&    // choose to disallow this
                                             one
     (fIsExec))                            // and it is a .exe
    {
    ii = s_idxStub;
}
```

The code example below illustrates the invention discussed above in conjunction with FIG. 23; in this case the code example is the do-nothing stub executable that replaces access to the disallowed executable(s).

```
int APIENTRY Main(
//
//
//
    HINSTANCE   /* hInstance      (unused) */,
    HINSTANCE   /* hPrevInstance  (unused) */,
    LPSTR       /* lpCmdLine      (unused) */,
    int         /* nCmdShow       (unused) */
)
{
    // Do nothing
    return 0;
} // End Main( )
```

Figure 24:
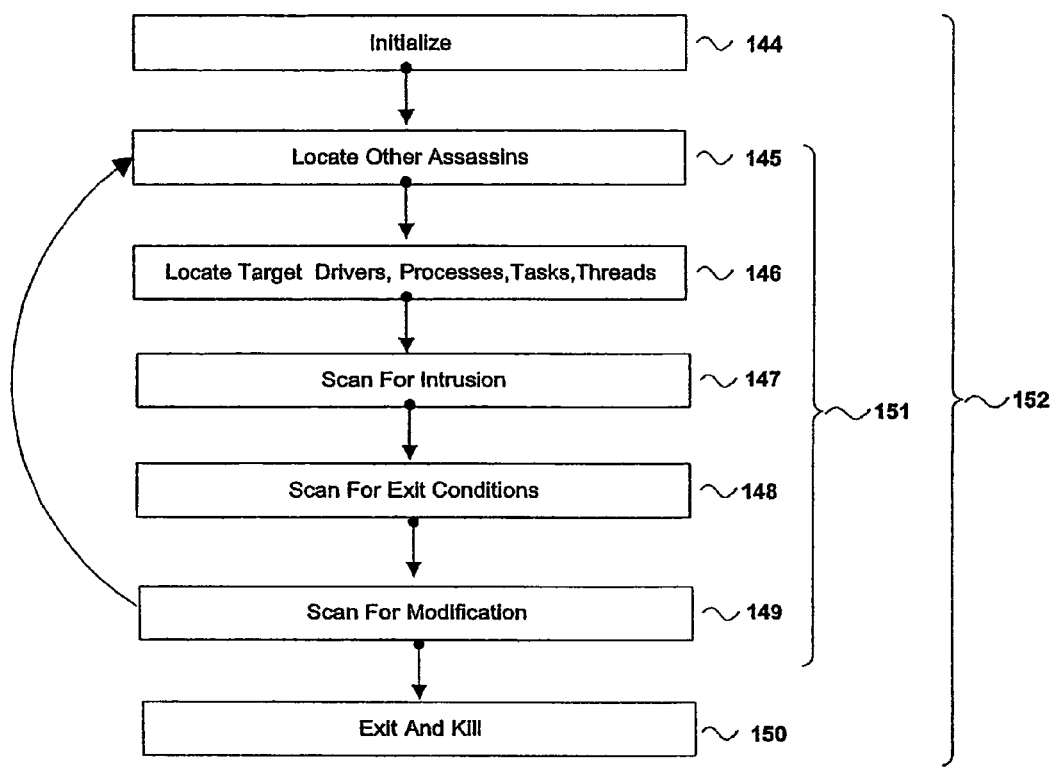
FIG. 24 is a flow diagram that illustrates a method for the creation of protective "assassin" processes, in accordance with the present invention.
Figure 25:
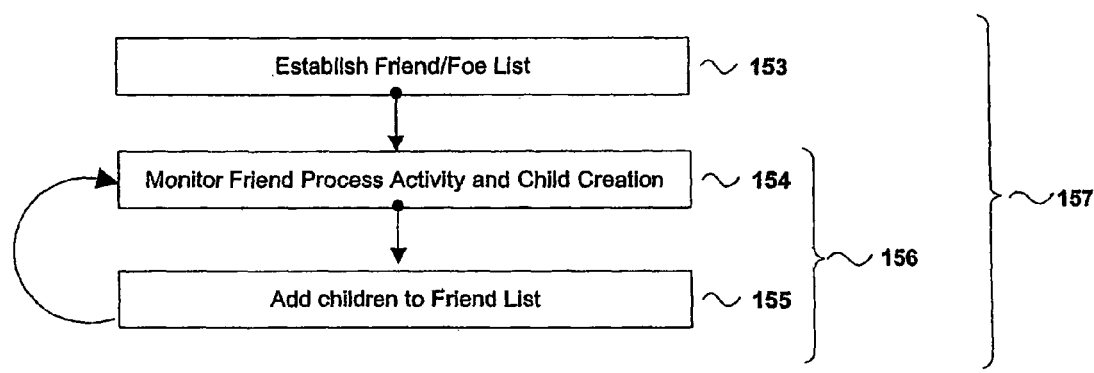
FIG. 25 is a flow diagram that describes methods that determine authorization for access to content, in accordance with the present invention.
Figure 26:
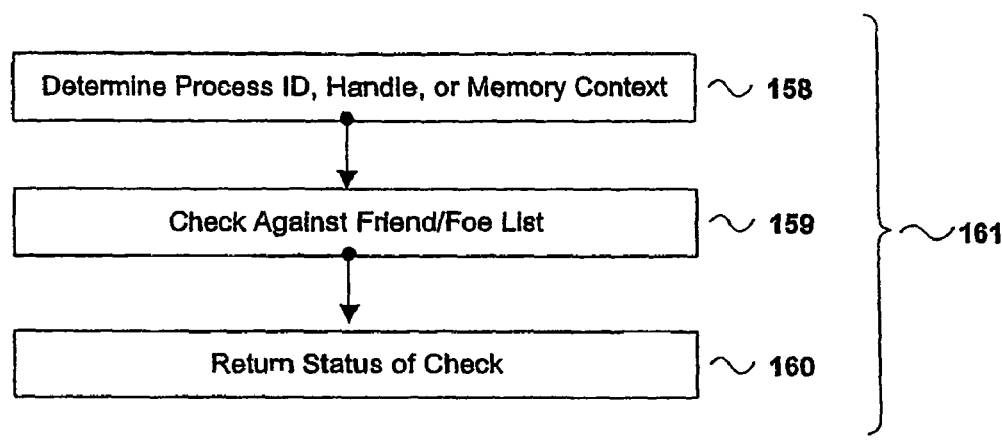
FIG. 26 is a flow diagram that describes methods that determine authorization for access to content, in accordance with the present invention.

In another embodiment of the present invention, a protective entity is created; such entity operates as an independent protective agent and secures all protected content from unauthorized access. As depicted in FIG. 24, this entity, referred to as an "assassin", may be programmed to have multiple functions. For example, the assassin upon initialization 144 first determines how many other assassins and other protected entities are present 145. System authorization functions are utilized 146 as depicted in FIG. 25, FIG. 26 to establish the correct identity of all processes on the system at all times. The assassin scans the system for the presence and execution of threat-entity-instances, such as debug tools like ProcDump and FileMon and even developer tools like Microsoft's Visial C++ 147. It also uses the functions detailed below to track the process or thread exit of any other entity including other assassins 148. Upon determining intrusion has occurred (debugger running, unauthorized exit of any other assassin protective entity, any changes or modifications 149 made to code or system components in any way within the system by any unauthorized entity, presence of ICE or other debugger) an exit condition is set up in which this assassin, and other assassins, and other system components will exit 150 based on either noticing that another has indeed exited or by passing a signal event between components of the system. In some cases an exiting assassin will kill 150 other system entities as a means of accelerating overall system component exit.

In the code example below, a first embodiment of the assassin process determines the identity of another assassin process (this is a two-assassin example) and instances 146, and monitors them for exit conditions 148. Upon an exit condition, this embodiment attempts to kill other assassin processes and then kills itself 150.

```
// Wait for a target entity to exit
static bool WaitAndDeleteInstance(
//
//
    DWORD    in_dwIdentWaitProc1,   // 1st proc to wait for
    DWORD    in_dwIdentWaitProc2,   // 2nd proc to wait for
    DWORD    in_dwIdentKillProc,    // proc to kill if proc 1 exits
    char*    inp_szFn,              // instances to delete
    char*    inp_szFnFk,            // more instances to delete
    char*    inp_szFnDel            // add'l instance to wait for (NULL for assassins)
)
{
    HANDLE   ahProc[2] = {NULL, NULL};   // handles to wait on
    DWORD    dwRes;                      // result from wait
    int      ii;
    char     szFnWait[MAX_PATH];         // instance to wait for
    char     szFnDel[MAX_PATH];          // instance to delete
    bool     fTargetInsOpenFailed = false;
    HANDLE   hTargetIns;
    char     szIsDel[MAX_PATH];
    char     szTargetIns[MAX_PATH];
    strcpy(szTargetIns, inp_szFn);
    strcat(szTargetIns, "target.inf");
    strcpy(szIsDel, inp_szFn);
    strcat(szIsDel, "targetEntity");
```

```
*/
  // Open handle to the 1st proc. This will be the 2nd assassin entity
  ahProc[0] = OpenEntity(ENTITY_ALL_ACCESS,
              FALSE,
              in_dwIdentWaitProc1);
  if (NULL == ahProc[0])
  {
    // If we can't open this entity handle, then something is definitely
    // wrong, so kill the redirected (target) entity if there is one
    if (0 != in_dwIdentKillProc)
    {
      KILL_ENTITY_FROM_IDENT(in_dwIdentKillProc);
    }
    // Delete the instances and return
    DelTree(inp_szFn);
    DelTree(inp_szFnFk);
    return false;
  }
  // If no other entity was specified, then the current entity must be one
  //   of the assassin entities
  if (0 == in_dwIdentWaitProc2)
  {
    // Wait for the original entity
    WaitForSingleObject(ahProc[0], INFINITE);
    // Kill the (target) entity if there is one
    if (0 != in_dwIdentKillProc)
    {
      KILL_ENTITY_FROM_IDENT(in_dwIdentKillProc);
    }
    CloseHandle(ahProc[0]);
    // Delete the instances
    DelTree(inp_szFn);
    return true;
  }
```

At this point, this embodiment has proven that two assassin process identifiers were specified. This means that the currently executing entity is the first assassin launched. The monitored identifiers will therefore be that of the second assassin entity and the application entity (target). This embodiment will wait for either one to exit; and assumes the target entity will exit when it is finished, in which case the first assassin entity can clean up and itself exit. If, on the other hand, it is the assassin entity that exits, this means that someone or something (a debug process perhaps) has killed it, so the first assassin entity will attempt to terminate the target entity and then delete all the instances of other system entities that it can.

```
  ahProc[1] = OpenEntity(ENTITY_ALL_ACCESS,
              FALSE,
              in_dwIdentWaitProc2);
  // If we opened handles to both entities, wait for one to exit
  if (NULL != ahProc[1])
  {
    dwRes = WaitForMultipleObjects(2,        // # of objects to wait for
               ahProc,      // handles of objs for wait
               FALSE,       // wait for any 1 obj
               INFINITE);   // how long to wait
    // If the assassin entity exited, that's an error
    if (WAIT_OBJECT_0 == dwRes)
    {
      // Kill the redirected (target) entity if there is one
      if (0 != in_dwIdentKillProc)
      {
        KILL_ENTITY_FROM_IDENT(in_dwIdentKillProc);
      }
      CloseHandle(ahProc[0]);
      CloseHandle(ahProc[1]);
      DelTree(inp_szFn);
      DelTree(inp_szFnFk);
      return false;
    }
    CloseHandle(ahProc[1]);
    ahProc[1] = NULL;
  }
  // Now only the assassin entity is left, so if an additional instance was
  //   specified, wait until we can delete it before proceeding
  if (NULL != inp_szFnDel)
  {
    // Set up instancename
    strcpy(szFnWait, inp_szFn);
    strcat(szFnWait, inp_szFnDel);
    // Wait a while
    for (ii = 0; ii < 180; ii++)
    {
      Sleep(500);
      // Exit the wait if the assassin entity dies or the signal
      //   instance disappears (or we can delete it)
      if ( (!CheckAssassinProc( ))             ||
           ((-1) == GetInstanceAttributes(szFnWait)) ||
           (DeleteInstance(szFnWait))              )
      {
        break;
      }
    }
  }
  // Kill the instances in our list
  for (ii = 0; ii < INSTANCE_DEL_NUM2; ii++)
  {
    strcpy(szFnDel, inp_szFn);
    strcat(szFnDel, INSTANCE_DEL_LIST2[ii]);
    DeleteInstance(szFnDel);
  }
  // Check if the instance exists
  if ((-1) != GetInstanceAttributes(szFnWait))
  {
    // Wait until either we delete the instance, or the assassin entity is
    //   killed
    while (!DeleteInstance(szFnWait))
    {
      dwRes = WaitForSingleObject(ahProc[0], 250);
      if (WAIT_OBJECT_0 == dwRes)
      {
        break;
      }
/*
      if (!fTargetInsOpenFailed)
      {
        hTargetIns = CreateInstance(szIsDel,
                    GENERIC_WRITE,
                    0,
                    NULL,
                    OPEN_EXISTING,
                    0, NULL);
        if (INVALIDENT_HANDLE_VALUE != hTargetIns)
        {
          CloseHandle(hTargetIns);
        }
        else
        {
          fTargetInsOpenFailed = true;
        }
      }
      // If the instance open failed at least once, try to delete it
      if (fTargetInsOpenFailed)
      {
        //DeleteInstance(szTargetIns);
      }
*/
    }
/*
      if (INVALIDENT_HANDLE_VALUE != hTargetIns)
      {
        CloseHandle(hTargetIns);
        hTargetIns = INVALIDENT_HANDLE_VALUE;
      }
*/
    // If the assassin entity was killed, that's an error
    if (WAIT_OBJECT_0 == dwRes)
    {
      // Kill the redirected (target) entity if there is one
      if (0 != in_dwIdentKillProc)
      {
```

```
            KILL_ENTITY_FROM_IDENT(in_dwIdentKillProc);
         }
         CloseHandle(ahProc[0]);
         DelTree(inp_szFn);
         DelTree(inp_szFnFk);
         return false;
      }
   }
}
// Now this invention knows that the target is really done, so clean up
// and exit
CloseHandle(ahProc[0]);
DelTree(inp_szFn);
//DelTree(inp_szFnFk);
// Success
return true;
} // End WaitAndDeleteInstance( )
```

In another embodiment of the present invention, a determination is made by the system as to whether any given process, thread, entity, or access 154 on/of the system is an authorized process or an unauthorized process with respect to access to any of the protected, encrypted, interleaved, or hidden components of the system. As illustrated in FIG. 25, FIG. 26 establishing such an authorization context and enforcing it involves a series of steps as outlined below. One simple way to illustrate this process is by representing the authorized versus unauthorized entities as "friend or foe", in the form of a list 156. A snapshot of all entities on the system is taken 153 and such a list is established 155. Any entities created subsequently, such as descendant children/entities of the original list entries, are appropriately added to the list 154. When an access occurs, the accessing entity is identified 158 and identity information is compared with the list 159 to determine whether the accessing process is a friend or foe. Access, or denial of access, is issued accordingly 160.

The code example below illustrates the above aspect of the invention as represented in FIG. 25, FIG. 26. In the first such example, the identity of an entity is added to the list, and the list is maintained as entity searches reveal new additions:

```
//
static VOID OnCreateEntity(
//
   DWORD EntityToken
)
{
   Identity_t entityIdentity;
   Identity_t DescendantIdentityIdentity = EntityToken ^ s_IdentityObfuscator;
   int    ii;
   entityIdentity = (Identity_t)OS_GetCurrentEntityHandle( );
   dprintf("Dsrt: OnCreateEntity *** Entity 0x%IX created process 0x%IX \n",
         entityIdentity, DescendantIdentityIdentity);
   // If the entity is in the allowed Identity list add the DescendantIdentity
   for (ii = 0; ii < MAX_Identity; ii++)
   {
      if (entityIdentity == s_IdentityTable[ii])
      {
                // If this Identity is already in the Identity array do not add
         for (ii = 0; ii < MAX_Identity; ii++)
         {
            // Found the DescendantIdentity in the table
            if (s_IdentityTable[ii] == DescendantIdentityIdentity)
            {
               break;
            }
         }
         // Exit outer loop if DescendantIdentity is already in table
         if ((ii < MAX_Identity) && (s_IdentityTable[ii] == DescendantIdentityIdentity))
         {
            break;
         }
         // Add a Identity to the array... Any 0 entry will do...
         for (ii = 0; ii < MAX_Identity; ii++)
         {
            if (s_IdentityTable[ii] == 0)
            {
               s_IdentityTable[ii] = DescendantIdentityIdentity;
               break;
            }
         }
         //if (MAX_Identity == ii)
         //{
         // Break out of the outer loop
         break;
      } // End if entity is in table
   } // End loop looking for entity in table
   return;
} // End OnCreateEntity( )
```

The next code example illustrates the above invention as represented in FIG. 25, FIG. 26. In this second such example, the identity of an entity is removed from the list:

```
static VOID OnDestroyEntity(
    DWORD   EntityToken
)
{
    Identity_t  IdentityDescendantIdentity;
    int  ii;
    IdentityDescendantIdentity = EntityToken ^ s_IdentityObfuscator;
    // Remove this Identity if it is in the list
    for (ii = 0; ii < MAX_Identity; ii++)
    {
        if (IdentityDescendantIdentity == s_IdentityTable[ii])
        {
            s_IdentityTable[ii]);
            s_IdentityTable[ii] = 0;
            break;
        }
    }
    return;
} // End OnDestroyEntity( )
```

The code example below illustrates mechanisms utilized to verify the identity of an entity and make a decision as to allowing or disallowing access to the entity.

```
// Verify the Identity...
for (ii = 0; ii < MAX_Identity; ii++)
{
    if (Identity == s_IdentityTable[ii])
    {
        //if ( (sFunc == FN_OPEN   ) ||
        //   (sFunc == FN_FILEATTRIB) )
        //{
            fIdentityMatch = TRUE;
            break;
    }
}
```

In another embodiment of this invention, any or all of the above aspects of the invention as illustrated and described above are incorporated into an application, or set of applications, and associated documentation, which are engineered to provide the aforementioned capabilities to digital content creation professionals and other such users. In this manner, digital content that a user desires to protect is provided to an appropriate toolkit as input and the techniques detailed above are applied to the content. The user is not necessarily exposed to the inner operation of the above processes, nor of the applied inventive techniques. The output of such a toolkit is a protected digital content entity. All types of content are supported and are equally applicable to the principles on the invention, including; audio, video, executable, images, text, documents, e-books, and all other digital content of all types on all platforms as described above. The user of this toolkit may choose to include or exclude any of the inventive components mentioned above as part of the configuration of the tool, but at no time is it necessary for the user to understand in any detail how each component works, or how the individual components of the system interact.

While this invention has been particularly shown and described with references to preferred embodiments thereof, it will be understood by those skilled in the art that various changes in form and details may be made herein without departing from the spirit and scope of the invention as defined by the appended claims.

We claim:

1. A method for preventing unauthorized use of digital content data hosted on a system, the method comprising:
   launching a first assassin process;
   determining, using the first assassin process, whether a second assassin process is executing a function;
   monitoring, using the first assassin process, an operating system via an operating system interface to determine whether an unauthorized attempt at accessing the digital content data by a threat entity occurs;
   determining, using the first assassin process, whether the second assassin process has exited from executing the function; and
   deterring a detected unauthorized attempt in response to the second assassin process having exited by using the first assassin process to terminate processes through the operating system interface that enable access to the digital content data.

2. The method of claim 1, further comprising determining, using the first assassin process, whether other assassin processes are executing functions, and, if so, causing the other assassin processes to exit in the event of the detected unauthorized attempt.

3. The method of claim 2, wherein the first assassin process and the other assassin processes exit in a non-deterministic order.

4. The method of claim 2, wherein an exit of any one of the assassin processes is construed as detection of the unauthorized access attempt.

5. The method of claim 4, further comprising:
   communicating the exit of the one assassin process to the other assassin processes, the other assassin processes exiting in response to the communication.

6. The method of claim 1, wherein deterring unauthorized access further includes generating saturation data to deter the detected unauthorized attempt.

7. The method of claim 1, wherein the monitoring includes assembling a list of processes authorized to access the digital content data and comparing a newly generated process with the list to determine if the newly generated process is authorized or unauthorized.

8. The method of claim 7, wherein the monitoring further includes identifying descendant processes of the processes of the list of processes authorized to access the digital content data and adding the descendant processes to the list of processes authorized to access the digital content data.

9. The method of claim 1, wherein the threat entity includes one or more of a debug process, system monitoring process, and a development process.

10. A computer system configured to prevent unauthorized use of digital content data, the system comprising:
    a processor executing an operating system;
    a storage device storing the digital content data; and
    an assassin module stored in the storage device and executed by the processor, the assassin module configured to
       launch a first assassin process,
       determine, using the first assassin process, whether a second assassin process is executing a function,
       monitor, using the first assassin process, the operating system via an operating system interface to determine whether an unauthorized attempt at accessing the digital content data by a threat entity occurs,
       determine, using the first assassin process, whether the second assassin process has exited from executing the function, and deter a detected the unauthorized attempt in response to the second assassin process having exited by using the first assassin process to terminate processes through the operating system interface that enable access to the digital content data.

11. The system of claim 10, wherein the assassin module further determines whether other assassin processes are executing functions, and, if so, causes the other assassin processes to exit in the event of the detected unauthorized attempt.

12. The system of claim 11, wherein the assassin module is further configured to cause the first assassin process and the other assassin processes to exit in a non-deterministic order.

13. The system of claim 11, wherein an exit of any one of the assassin processes is construed as detection of the unauthorized access attempt.

14. The system of claim 13, wherein the assassin module is further configured to:

communicate the exit of the one assassin process to the other assassin processes, which causes the other assassin processes to exit in response to the communication.

15. The system of claim 10, further comprising a saturation engine configured to generate saturation data to deter the detected unauthorized attempt.

16. The system of claim 10, wherein the assassin module is further configured to monitor by assembling a list of processes authorized to access the digital content data and comparing a newly generated process with the list to determine if the newly generated process is authorized or unauthorized.

17. The system of claim 16, wherein the assassin module is further configured to identify descendant processes of the list of processes authorized to access the digital content data and to add the descendant processes to the list of processes authorized to access the digital content data.

18. The system of claim 10, wherein the threat entity includes one or more of a debug process, system monitoring process, and a development process.

* * * * *